United States Patent [19]
Watanabe

[11] Patent Number: 5,522,015
[45] Date of Patent: May 28, 1996

[54] NEURAL NETWORK AND LEARNING METHOD FOR LINEARLY UNSEPARABLE PATTERNS

[75] Inventor: Ryujin Watanabe, Wako, Japan

[73] Assignee: Honda Giken Kogyo Kabushiki Kaisha, Tokyo, Japan

[21] Appl. No.: 384,732

[22] Filed: Feb. 10, 1995

Related U.S. Application Data

[63] Continuation of Ser. No. 907,644, Jul. 2, 1992, abandoned.

[30] Foreign Application Priority Data

Jul. 3, 1991  [JP]  Japan .................................. 3-163142

[51] Int. Cl.$^6$ ...................................................... G06F 15/18
[52] U.S. Cl. ......................................................... 395/23
[58] Field of Search ................................. 395/23, 21, 22, 395/24

[56] References Cited

U.S. PATENT DOCUMENTS

| | | | |
|---|---|---|---|
| 4,912,647 | 3/1990 | Wood ........................................ | 395/23 |
| 5,003,490 | 3/1991 | Castelaz et al. ......................... | 395/22 |
| 5,033,006 | 7/1991 | Ishizuka et al. ......................... | 395/23 |
| 5,265,224 | 11/1993 | Maruno ..................................... | 395/21 |

FOREIGN PATENT DOCUMENTS

| | | | |
|---|---|---|---|
| 0360674 | 3/1990 | European Pat. Off. ........ | G06F 15/80 |

OTHER PUBLICATIONS

A. D. McAulay, "Engineering design neural networks using split inversion learning," IEEE First Int'l. Conf. on Neural Networks, pp. IV–635 to IV–641.

S. Y. Kung and J. N. Hwang, "An Algebraic Projection Analysis for Optimal Hidden Units Size and Learning Rates in Back–Propagation Learning", IEEE Int'l. Conf. on Neural Networks, pp. 1–363 to 1–370.

E. B. Baum, "Neural Net Algorithms that Learn in Polynomial Time from Examples and Queries," IEEE Trans. on Neural Networks, vol. 2 (1), pp. 5–19.

"On Hidden Nodes for Neural Nets" by G. Mirchandani, IEEE Transactions on Circuits and Systems, May 1989, No. 5, pp. 661–664, New York.

"Conditions on Activation Functions of Hidden Units for Learning by Backpropagation", M. Arai et al, International Neural Network Conference, Jul. 1990, pp. 877–880.

"Training of a Neural Network for Pattern Classification Based on an Entropy Measure" by C. Koutsouger AS et al, IEEE International Conference of Neural Networks, Jul. 1988, pp. 247–254.

"The Piecewise Linear Neural Network: Training and Recognition", Y. H. Kong et al, I JCNN International Joint Conference on Neural Networks, vol. 3, Jun. 17 1990, San Diego, pp. 245–250.

"Neural Network Design Using Voronoi Diagrams: Preliminaries", Bose et al, IEEE, pp. 7–11, Jun. 1992.

"The Upstart Algorithm: A Method for Constructing and Training Feedforward Neural Networks", M. Frean, Neural Computation, vol. 2, pp. 198–209, 1990, Massachusetts Institute of Technology.

"Learning in Feedforward Layered Networks: The Tiling Algorithm", M. Mezard et al, Journal of Physics A: Math, Gen. vol. 22, pp. 2191–2203, 1989.

"Design Artificial Neural Network based on the Principle of Divide–and –Conquer", P. Lian, 6/11–14/1991, pp. 1319–1322.

"Characterizing the Error Function of a Neural Network", B. Moore et al, Dec. 31 1988, pp. 49–57.

"Solving Large–Scale Optimization Problems in Divide- –and Conquer Neural Networks" Y. P. Simon Foo, Jun. 18–22 1987, pp. 507–511.

"Problem Decomposition and Subgoaling in Artificial Neural Networks", P. Liang, Nov. 4–7 1990, pp. 178–181.

*Primary Examiner*—Robert W. Downs

[57] ABSTRACT

A neural network has an input layer, a hidden layer, and an output layer. The neural network includes a lower neural network model composed of hidden layer neurons and input layer neurons for learning a plurality of linearly separable patterns, and a higher neural network model composed of hidden layer neurons and output layer neurons for combining the linearly separable patterns into a linearly unseparable pattern.

13 Claims, 19 Drawing Sheets

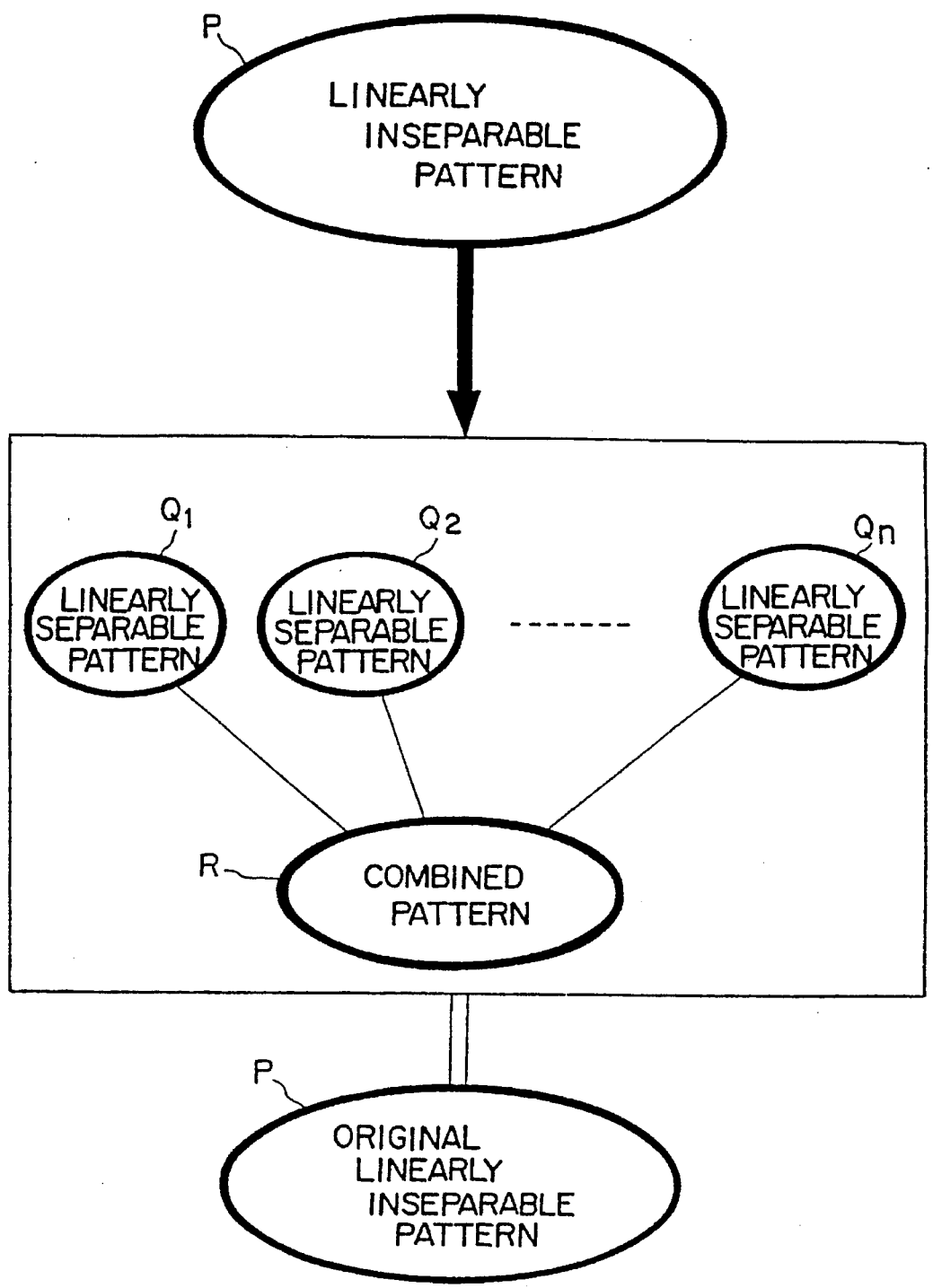

$(((A \ominus B) \oplus C) \ominus D)$

FIG. 13

DESCRIPTION OF VARIABLES

| | |
|---|---|
| $k$ | ITERATION VARIABLE OF ALGORITHM $\gamma$ (PATTERN ASSIGNING ALGORITHM FOR HIDDEN LAYER NEURONS) |
| $\ell$ | ITERATION VARIABLE FOR ALGORITHM $\delta^k$ (LEARNING ALGORITHM FOR HIDDEN LAYER NEURONS) |
| $p$ | VARIABLE REPRESENTING PATTERN SUFFIX. |
| $i$ | VARIABLE REPRESENTING SUFFIX TO ELEMENTS OF INPUT VECTOR OF LEARNING PATTERN. |
| $sw$ | VARIABLE REPRESENTING WRONG ANSWER |
| $t[k][p]$ | TARGET OUTPUT FOR $X^k_{ON}, X^k_{OFF}$, NEURON OF HIDDEN LAYER. CORRESPONDS TO $X^k_{ON}, X^k_{OFF}$ OF ALGORITHM $\gamma$. PATTERN $p$ WITH $t[k][p]$ BEING 1 IS CONTAINED IN $X^k_{ON}$, AND PATTERN $p$ WITH $t[k][p]$ BEING 0 IS CONTAINED IN $X^k_{OFF}$. |
| $t_M[k][p]$ | LINEARLY SEPARABLE LEARNING PATTERN WITH RESPECT TO $k$TH NEURON OF HIDDEN LAYER GENERATED BY ALGORITHM. CORRESPONDS TO $X^k$ OF ALGORITHM $\gamma$ AND $Y^k_{ON}, Y^k_{OFF}$ OF ALGORITHM $\delta^k$. PATTERN $p$ WITH $t_M[k][p]$ BEING 1 IS CONTAINED IN $Y^k_{ON}, X^k$ AND PATTERN $p$ WITH $t_M[k][p]$ BEING 0 IS CONTAINED IN $Y^k_{OFF}$. |
| $LU[p]$ | CORRESPONDS TO $i_{LU}$ OF ALGORITHM $\delta^k$. PATTERN $p$ WITH $LU[p]$ BEING 1 IS CONTAINED IN $i_{LU}$. |

SYMBOLS USED ARE DEFINED AS FOLLOWS

- ⎯ INDICATES REPETITION
- ⋁ INDICATES BRANCHES. IF TRUE, PROCESSING GOES TO UPPER STEP, AND IF FALSE, PROCESSING GOES TO LOWER STEP. WHEN FINISHED, PROCESSING PROCEEDS TO NEXT STEP.
- break INDICATES CANCELLING OF PRESENTLY EFFECTED REPETITON, AND PROCESSING OF NEXT STEP
- $t_M[l][i] = t[k][i]$ $i=1\sim ni$ INDICATES VARYING OF $i$ FROM 1 TO $n$, AND SUBSTITUTION OF $t[k][i]$ INTO $t_M[l][i]$.
- "=" INDICATES COMPARISON.
- ":=" INDICATES SUBSTITUTION.

FLOWCHART OF ALGORITHM $\delta^k$

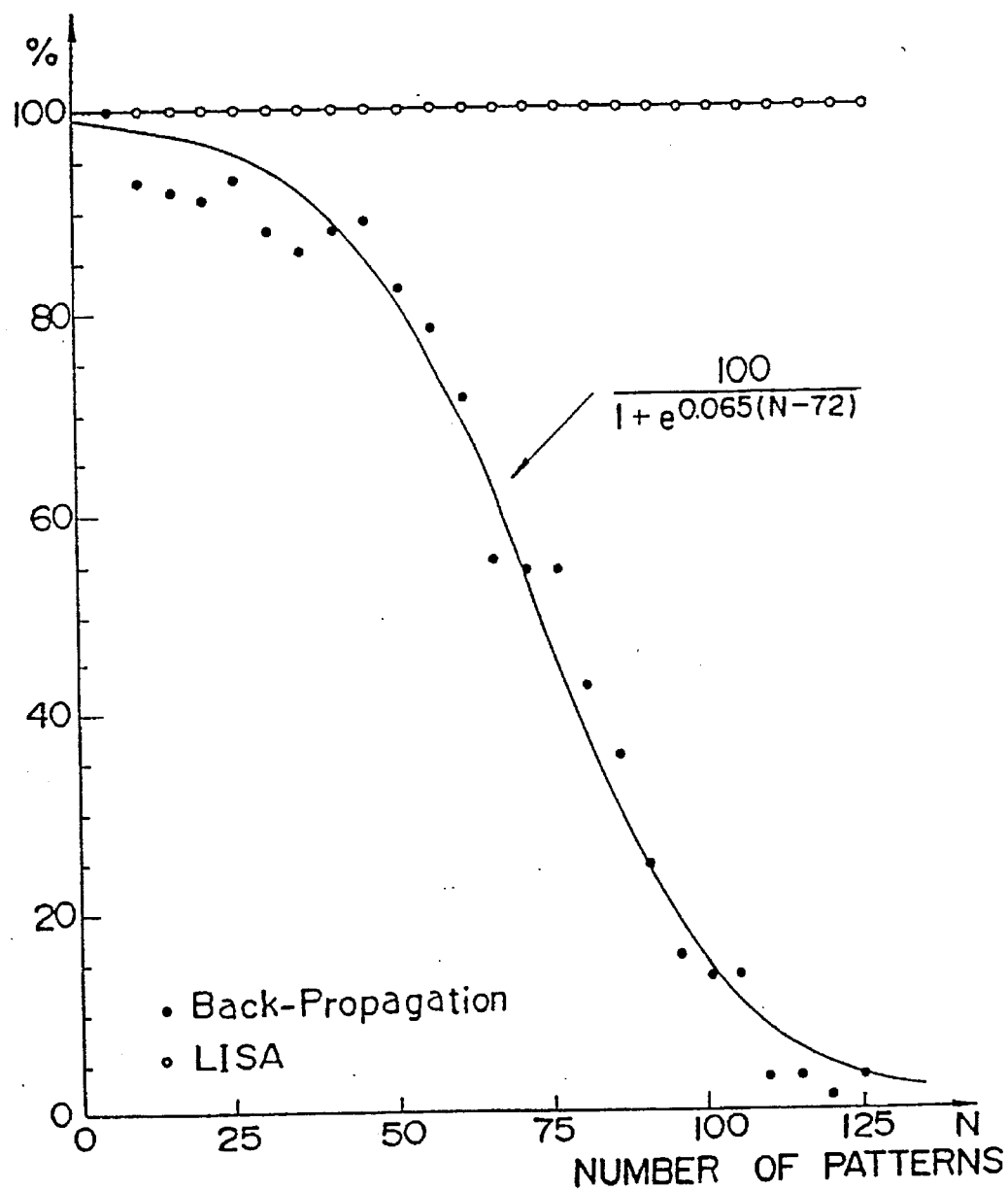

NEURAL NETWORK AND LEARNING METHOD FOR LINEARLY UNSEPARABLE PATTERNS

This application is a continuation of application Ser. No. 07/907,644, filed on Jul. 2, 1992, now abandoned, the entire contents of which are hereby incorporated by reference.

BACKGROUND OF THE INVENTION

1. Field of the Invention

The present invention relates to a neural network, and more particularly to a neural network that can be trained to learn a linearly unseparable input pattern and output values therefor (the combination of such a linearly unseparable input pattern and output values therefor will be referred to as an "input/output pattern"), and a learning method for such a neural network.

2. Description of the Background Art

Various models for neural networks have heretofore been proposed. It is known that the perceptron is the most basic neural network model. The perceptron is based on the learning process in which only the weight of association (association coefficient) between input and output layers is varied. The learning process of the perceptron is advantageous in that it is simpler than other learning processes. The learning process is a process in which the weight is varied to get the output to approach a target output.

However, the perceptron has a problem in that it cannot be trained to learn linearly unseparable patterns. If a pattern that can be classified into two kinds is linearly separable, it can be separated into the classifications in a straight line when it is two-dimensional and in a multidimensional plane when it is three-dimensional or more.

The problem of the perceptron is that linearly unseparable patterns that cannot be learned can be solved by a process known as back propagation. The back propagation is applicable to a multilayer neural network model, and allows linearly unseparable patterns to be learned. The back propagation basically serves to minimize the square function of an error between a target output and an actual output, and uses an optimization process referred to as the method of steepest descent. Therefore, if there is a local minimum present in an error function obtained from given input/output patterns, then a learning failure may result when trapped in the local minimum. The back propagation is also disadvantageous in that it is cumbersome to adjust parameters and initialize the weight, and difficult to determine the number of necessary neurons of a hidden layer between input and output layers, and the process requires a large amount of calculation and is time-consuming.

There have also been proposed algorithms for adding neuron units needed to construct a multilayer neural network.

One of the proposed algorithms serves to determine the number of neuron unit layers of a feedforward hierarchical network and the number of neuron units in each of the neuron unit layers. It adds neuron unit layers or neuron units in neuron unit layers until convergence is reached. For details, see *The Upstart Algorithm: A method for Constructing and Training Feedforward Neural Networks*, written by Marcus Frean, Neural Computation, Vol. 2, pages 198–209, 1990, Massachusetts Institute of Technology.

According to another proposed algorithm, neuron units are added as required according to predetermined rules in order to build a multilayer perceptron composed of linear threshold units. For details, see *Learning in feed-forward layered networks: the tiling algorithm*, written by Marc Mézard and Jean-Pierre Nadal, Journal of Physics A: Math. Gen. Vol. 22, pages 2191–2203, 1989.

The above proposed algorithms add necessary neuron units until a desired output is obtained with respect to a given input. Therefore, neuron layers and neurons thereof which are not required are not determined until a neural network is finally constructed, and the number of neuron layers used and the number of neurons used tend to be large. As a result, the resultant neuron networks are liable to be complex in structure, and do not lend themselves to high-speed processing operation.

SUMMARY OF THE INVENTION

It is an object of the present invention to provide a neural network which solves the problem of linear unseparableness of the perceptron and the problem of being trapped in a local minimum of back propagation, and which can learn a linearly unseparable pattern with as few neurons as possible, and also a learning method for automatically generating hidden neurons necessary for such a neural network.

According to the present invention, there is provided a neural network comprising an input layer composed of a plurality of input neurons for receiving an input signal, a hidden layer composed of one or more hidden neurons for processing a signal received from the input neurons, and an output layer composed of one or more output neurons for processing a signal received from the hidden neurons and producing an output signal, the input and hidden layers being coupled to each other by association coefficients determined by a learning process, the hidden and output layers being coupled to each other by association coefficients determined such that a given input/output pattern is realized by a combination of linearly separable patterns realized by the hidden neurons, the hidden layer comprising one or more hidden layers, the hidden neurons of at least one of the hidden layers being automatically generated as required according to a predetermined process as the learning process progresses.

According to the present invention, there is also provided a learning method for a neural network having an input layer composed of a plurality of input neurons for receiving an input signal, a hidden layer composed of one or more hidden neurons for processing a signal received from the input neurons, and an output layer composed of one or more output neurons for processing a signal received from the hidden neurons and producing an output signal, the method comprising the steps of determining whether a given input/output pattern is linearly separable or not, applying an input pattern to the input layer and a corresponding output value to the hidden neurons to effect a predetermined learning process on the hidden neurons, if the given input/output pattern is linearly separable, determining association coefficients between the output and hidden layers such that a signal from the hidden neurons and an output signal from the output neurons which receive the signal from the hidden neurons are equal to each other, allocating a pattern determined by a predetermined learning pattern determining process, between the hidden and input layers to effect the learning process on the hidden neurons, if the given input/output pattern is linearly unseparable, and determining the association coefficients between the output and hidden layers to realize a given input/output pattern with a combination of linearly separable patterns realized by the hidden neurons.

When the input/output pattern is linearly separable, an input pattern is applied to the input layer, and a desired output is applied to the hidden neurons, and the learning process is effected on the hidden neurons to determine the association coefficients between the output and hidden layers. When the input/output pattern is linearly unseparable, the association coefficients between the output and hidden layers are determined to realize a given input/output pattern with a combination of linearly separable patterns realized by the hidden neurons. The linearly separable pattern is allocated between the input and hidden layers for learning.

The hidden neurons of the hidden layer between the input and output layers are automatically generated, so that a linearly unseparable input/output pattern is divided into linearly separable input/output patterns, which are then combined together. As a whole, the neural network is capable of learning input/output patterns that are linearly unseparable. Since the input and output layers are provided in advance, and only a minimum number of hidden neurons or a number of hidden neurons close thereto are determined, the neural network is highly versatile, and can operate at high speed for information processing.

Experimental results, described later on, indicate that the learning method was able to learn all input/output patterns with four inputs and one output. The learning method had a learning speed about 500 times faster than the learning speed of the back propagation process. Patterns whose inputs are all 0 can be learned by expanding or modifying the basic arrangement of the neural network and the learning method according to the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The above and other objects, features, and advantages of the present invention will become apparent from the following description when taken in conjunction with the accompanying drawings which illustrate preferred embodiments of the present invention by way of example, and thus are not limitative of the present invention, and wherein:

FIG. 1 is a block diagram illustrating the fundamental concept of the present invention;

FIG. 13 is a diagram of definitions of variables shown in FIGS. 11 and 12;

FIG. 23 is a graph showing percentages of correct answers according to the learning method of the present invention and the back propagation method with respect to the number of patterns.

DETAILED DESCRIPTION OF THE PREFERRED EMBODIMENTS

FIG. 1 shows the fundamental concept of the present invention. According to the present invention, as shown in FIG. 1, a linearly unseparable input/output pattern P is divided into linearly separable patterns $Q_1, Q_2, \ldots, Q_n$, and a combination pattern R for combining the linearly separable patterns $Q_1, Q_2, \ldots, Q_n$ is generated. The linearly separable patterns $Q_1, Q_2, \ldots, Q_n$ are implemented by hidden neurons, and the combination pattern R is implemented by output neurons, so that the linearly unseparable input/output pattern P can be learned as a whole.

According to the present invention, a neural network having input, output, and hidden layers comprises a lower neural network model composed of hidden layer neurons and input layer neurons for learning the linearly separable patterns $Q_1, Q_2, \ldots, Q_n$, and a higher neural network model composed of hidden layer neurons and output layer neurons for combining the linearly separable patterns $Q_1, Q_2, \ldots, Q_n$ into the linearly unseparable pattern P.

The learning method according to the present invention effects a predetermined learning process on a feed-forward neural network for generating a plurality of linearly separable patterns from a given linearly unseparable pattern.

The neural network and the learning method therefor will hereinafter be described in greater detail.

(1) Formation of a neural network:

Any optional input/output pattern including a linearly unseparable pattern P can be represented by a combination of linearly separable patterns $Q_1, Q_2, \ldots, Q_n$.

Figure 2A:
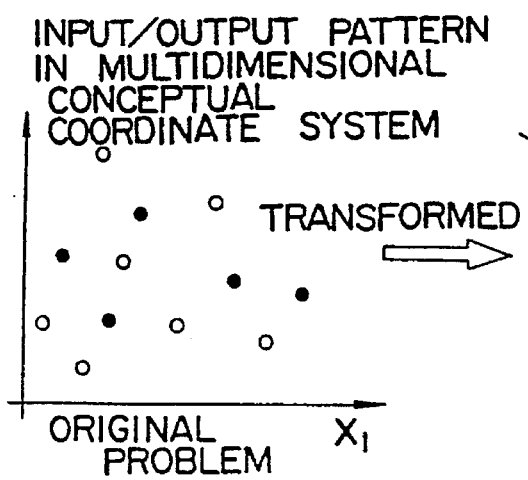
FIGS. 2(a) through 2(f) are diagrams showing a principle for transforming a linearly unseparable pattern into a linearly separable pattern.

For example, as shown in FIG. 2(a), two patterns indicated respectively by black dots (ON) and white dots (OFF) are presented in a multidimensional conceptual coordinate system that is conceptually represented by two-dimensional coordinates. The issue here is whether these patterns are linearly separable.

Figure 2B:
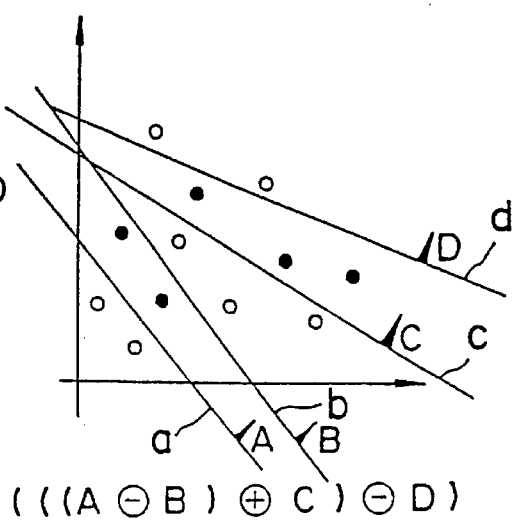

Now, straight lines a, b, c, d as shown in FIG. 2(b) are introduced into the patterns. The patterns shown in FIG. 2(a) can be expressed by sum and difference sets in regions indicated by respective upwardly directed arrows on the straight lines.

The characters typed in bold represent vectors in the following description.

The straight lines a, b, c, d are represented as follows:

a: $w_A^T x = \theta$, b: $w_B^T x = \theta$, c: $w_C^T x = \theta$, d: $w_D^T x = \theta$ where w is a association weight vector, x is a state value vector of input neurons, $^T$ represents transposition, and $\theta$ is a threshold. In FIG. 2(b), $w_A > 0$, $w_B > 0$, $w_C > 0$, $w_D > 0$, and $\theta \geq 0$.

Figure 2C:
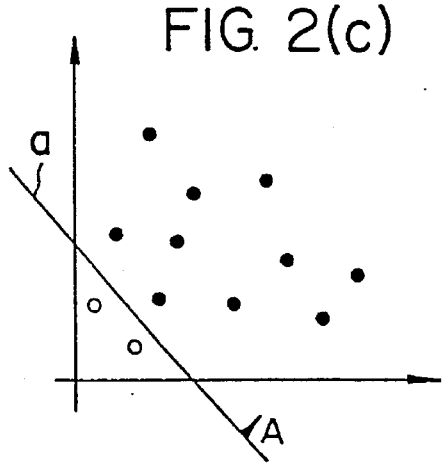
Figure 2D:
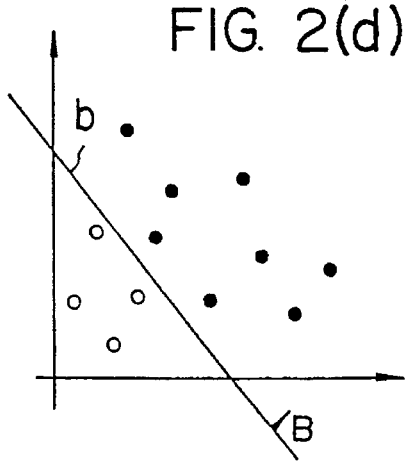
Figure 2E:
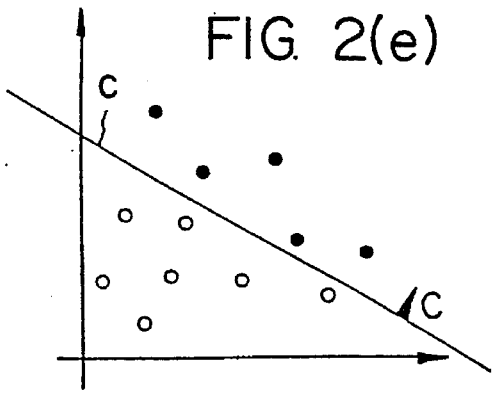

As shown in FIGS. 2(c) through 2(f), the sets of the black dots in the regions indicated by the upwardly directed arrows on the straight lines are contained in the following regions:

Set of black dots in FIG. 2(c): $w_A^T x > \theta$;

Set of black dots in FIG. 2(d): $w_B^T x > \theta$;

Set of black dots in FIG. 2(e): $w_C^T x > \theta$; and

Figure 2F:
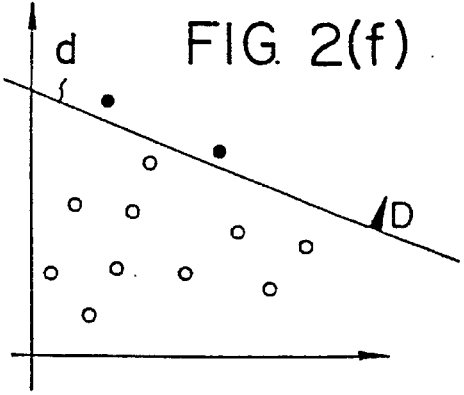

Set of black dots in FIG. 2(f): $w_D^T x > \theta$.

These regions or sets are indicated by A, B, C, D, respectively. If an operation to determine a sum set is indicated by a symbol <+> and an operation to determine a difference set is indicated by a symbol <->, then the two types of patterns that are separated as shown in FIG. 2(b) are expressed as follows:

{(A<+>B)<+>C}<->D.

Whether the variable vector x in the regions A, B, C, D is contained in the regions or not can be indicated by whether the values of $L(w_A^T x - \theta)$, $L(w_B^T x - \theta)$, $L(w_C^T x - \theta)$, $L(w_D^T x - \theta)$ are 1 or 0, where L is a threshold function that is 1 or 0 depending on a variable z as follows:

when $z \geq 0$, $L(z) = 1$, and when $z < 0$, $L(z) = 0$.

If any of the above values is 1, then the variable vector x is present in the region indicated by w.

If it is assumed that the above values are expressed as follows:

$x_A = L(w_A^T x - \theta)$, $x_B = L(w_B^T x - \theta)$, $x_C = L(w_C^T x - \theta)$, and $x_D = L(w_D^T x - \theta)$, then the patterns shown in FIG. 2(b) can be expressed by the following equation:

$$y = L((\theta + \epsilon)x_A - 2\epsilon x_B + 2\epsilon x_C - 2\epsilon x_D - \theta)$$

where $\epsilon$ is a positive number and $\epsilon < \theta$.

The coefficients, indicated by $\theta$ and $\epsilon$, of $x_A$, $x_B$, $x_C$, $x_D$ may not strictly be of the values given by the above equations, but may be of any values or, broadly stated, may not be defined by the above equations, insofar as the input/output relationship between $x_A$, $x_B$, $x_C$, $x_D$ and y is the same as the above equations.

y has a value of 1 with respect to the black dots in FIG. 2(a) and a value of 0 with respect to the white dots in FIG. 2(a). In this manner, even if the original input/output pattern is linearly unseparable, it can be transformed into linearly separable patterns, and can be expressed by neural network models.

The above process is generalized by replacing $x_A$, $x_B$, $x_C$, $x_D$ with $x^1$, $x^2$, $x^3$, $x^4$, respectively, and rewriting the above equations as follows:

$x^1 = L(w_A^T x - \theta)$, $x^2 = L(w_B^T x - \theta)$, $x^3 = L(w_C^T x - \theta)$, $x^4 = L(w_D^T x - \theta)$, and $y = L((\theta + \epsilon)x^1 - 2\epsilon x^2 + 2\epsilon x^3 - 2\epsilon x^4 - \theta)$ If necessary, $x^5$, $x^6$, $x^7$, ... may be added.

Figure 3:
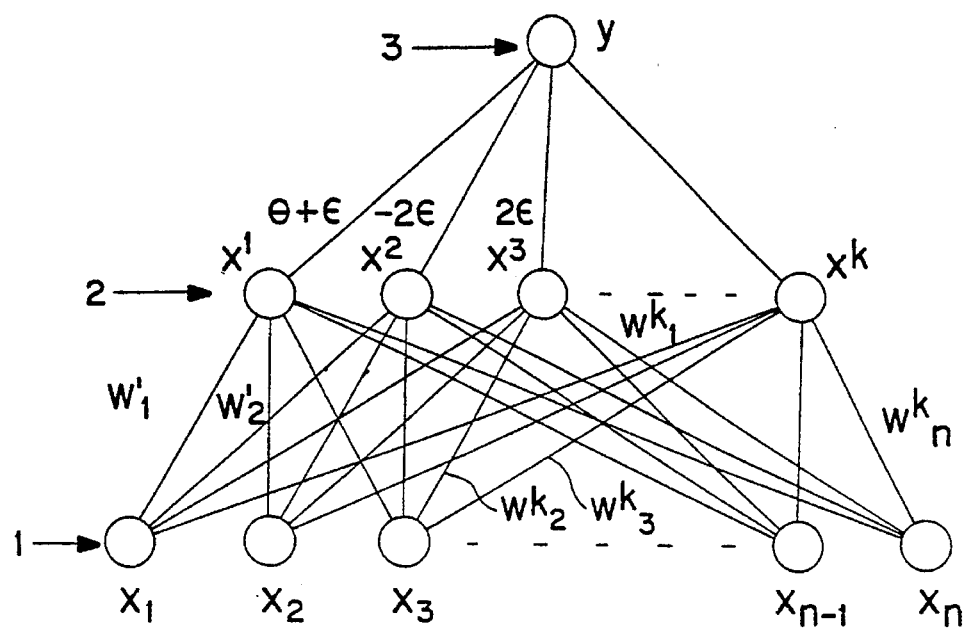
FIG. 3 is a diagram of a neural network according to the present invention.

The above general equations apply to a three-layer neural network having an input layer 1, a hidden layer 2, and an output layer 3 as shown in FIG. 3, and indicate the relationship between state values $x^1$, $x^2$, $x^3$, ... of neurons of the hidden layer 2 and the state value y of neurons of the output layer 3. The input layer 1 is composed of a plurality of n neurons whose state values are indicated by $x_1$, $x_2$, ..., $x_n$, and the output layer 3 is composed of a single neuron whose state value is indicated by y. These neurons are given in advance to the layers.

In FIG. 3, association coefficients between the hidden layer 2 and the output layer 3 are determined such that the original input/output pattern is realized by a combination of linearly separable patterns realized by the neurons of the hidden layer 2. Specifically, the association coefficients between the hidden layer 2 and the output layer 3 are determined such that, using the positive number $\epsilon$, the sum ($\theta + \epsilon$) of association coefficients between output neurons and first through odd-numbered hidden neurons is greater than the threshold $\theta$, and the sum ($\theta - \epsilon$) of association coefficients between output neurons and first through even-numbered hidden neurons is smaller than the threshold $\theta$.

The threshold function $L(w^T x - \theta)$ as a basis for the above mathematical model is known as the McCulloch-Pitts neuron model. Since the threshold function $L(w^T x - \theta)$ can be implemented by hardware or software, the neural network model shown in FIG. 3 can also be realized.

(2) Formation of linearly separable patterns:

In the neural network wherein the association coefficients (weights) between the higher neurons, i.e., between the hidden and output layers, are determined as described above in (1), association coefficients indicated by $w^j_i$, i=1, 2, ..., n; j=1, 2, ..., k in FIG. 3) between lower neurons, i.e., between the input and hidden layers, are determined according to a learning process, described below, for generating linearly separable patterns from a linearly unseparable pattern. The linearly unseparable pattern is then transformed into linearly separable patterns by the neural network model with the association coefficients thus determined.

[Learning process]

If target and actual outputs are the same as each other, the weights are not altered.

If target and actual outputs are different from each other, then using $\alpha$ indicated by:

$$\alpha = (\theta - w^{dT}x) / \sum_i x_i$$

the weights $w^d$ are altered according to the following equation:

$$w^{d+1} = w^d + \alpha * x$$

where d is a suffix indicative of the number of repeated calculations (iteration).

Having effected the above learning process, it is checked whether the alteration of the association coefficients $w^d$ is 0 or not with respect to all input patterns. If the alteration of the association coefficients $w^d$ is 0 and there is a pattern with respect to which target and actual outputs are different from each other, then it is determined that a linearly unseparable pattern has been learned. If this is the case, then any subsequent patterns with respect to which target and actual outputs are different from each other are stored, a set of linearly unseparable elements called a "linearly unseparable core pattern set" that serves as an origin of the linearly unseparable pattern is obtained.

If a pattern to be learned is linearly separable, then it can be learned according to the above learning process. If a pattern to be learned is linearly separable, then a linearly unseparable core pattern set is obtained according to the above learning process. Thereafter, one of the two patterns, e.g., an OFF pattern of the two ON/OFF patterns, is selected from the obtained linearly unseparable core pattern set such that, for example, an input pattern with a maximum norm is selected. The transformation is carried out by changing the selected OFF pattern to an ON pattern.

Based on the newly obtained ON/OFF pattern, the learning process is effected again, and the allocation is finished when a certain finishing condition (described later on) is satisfied. If no finishing condition is satisfied, then a linearly unseparable core pattern set is determined, and one of the OFF patterns thereof is changed to an ON pattern. The above process is repeated until all patterns are made linearly separable.

A linearly separable pattern can be obtained according to the above learning process. The result of the process is shown in FIG. 2(c). To obtain a pattern as shown in FIG. 2(d), the difference between the pattern shown in FIG. 2(c) and the original pattern, i.e., the pattern shown in FIG. 2(a) is used as a new original pattern, and the above learning process is effected to check if the new original pattern is linearly separable or not.

The aforesaid process is executed until the difference between two patterns becomes a linearly separable pattern. Thereafter, the input/output patterns that have been given at first, including a linearly separable pattern, are learned with the neural network, as shown in FIG. 3, including hidden layer neurons having weights corresponding to the patterns. FIG. 3 will be described in detail later on.

Figure 21:
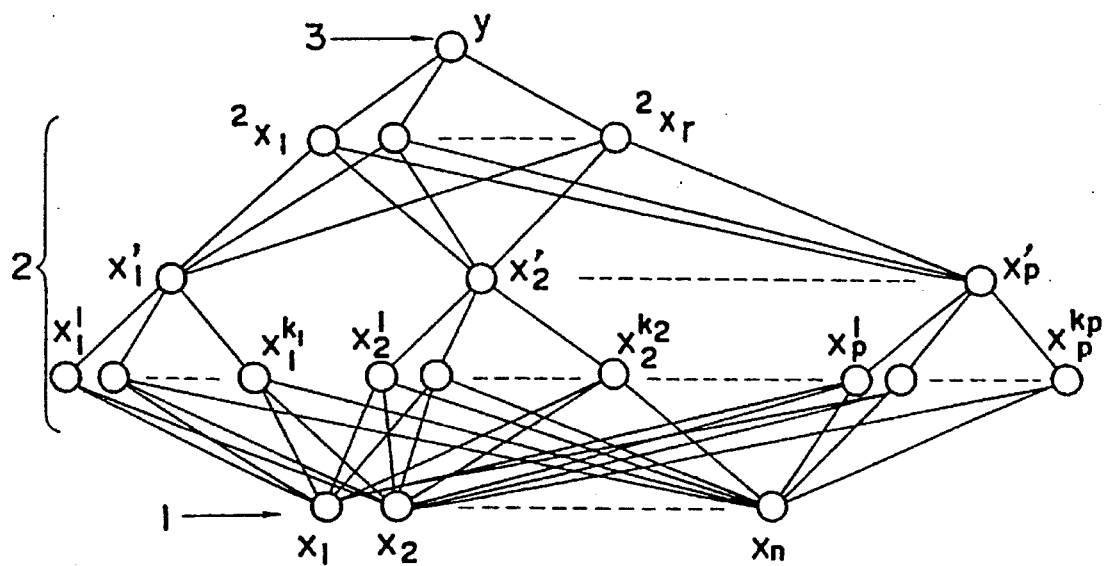
FIG. 21 is a diagram of a multilayer neural network having a plurality of hidden layers.

The principle of the present invention is applicable not only to the three-layer neural network as shown in FIG. 3, but also to a multilayer neural network having an input layer 1, a plurality of hidden layers 2, and an output layer 3, as shown in FIG. 21. In FIG. 21, the neural network has three hidden layers 2, and neurons of the first and third hidden layers 2 as counted from the input layer 1 are generated as required as the learning process proceeds. Neurons of the second hidden layer 2 are provided in advance as output neurons (corresponding to the output neuron y in FIG. 3) with respect to the neurons of the first hidden layer 2 adjacent to the input layer 1. FIG. 21 will also be described in detail later on.

The present invention will now be described in greater detail by way of mathematical models, successively in topics as follows:

(1) Linear separability;
(2) Linearly separable allocation algorithm;
(3) Determination of separating hyperplanes; and
(4) Overall algorithm.

(1) Linear separability:
The input/output relationship between neurons is expressed by:

$$x_{out}=h(x^T w-\theta) \tag{1}$$

where the transformation function h is a continuous threshold function represented by:

$h(z)=1$ when $z>0$, and $$h(z)=0 \text{ when } z<0 \tag{2}$$

where x is an n-dimensional binary vector (Boolean vector), indicating the state value of input neurons, $x_{out}$ is a binary scalar, indicating the state value of output neurons, $w \in R^n$ is a association weight vector of a synapse corresponding to the input vector x, and $\theta \in R^1$ is a neuron threshold in the form of a positive constant.

The term "learning" denotes a process in which the association weights w are altered until the output $x_{out}$ of a network composed of a neuron model according to the equation (1) above has a desired value with respect to an input of m n-dimensional binary vectors x.

It is assumed that the set of m n-dimensional input vectors $x=(x_i)$ is represented by x, a set of input vectors whose target output is 1 is referred to as an ON pattern set and indicated by $X_{ON}$, and a set of input vectors whose target output is 0 is referred to as an OFF pattern set and indicated by $X_{OFF}$. The elements of these latter two sets are called respectively as "ON pattern" and "OFF pattern". The following assumption is provided for these ON and OFF patterns: Assumption a: $X_{ON} \cap X_{OFF} = \phi$ (empty set).

A process for determining w which satisfies the equations:

$h(x^T W-\theta)=1$ $(x \in X_{ON})$, $$h(x^T W-\theta)=0 \ (x \in X_{OFF}) \tag{3}$$

that is, the inequalities:

$x^T W > \theta (x \in X_{ON})$, $$x^T W < \theta (x \in X_{OFF}) \tag{4}$$

is the learning process.

If there is a solution w according to the above formulas, then there is a hyperplane:

$$x^T W = \theta \tag{5}$$

which separates the pattern sets $X_{ON}$, $X_{OFF}$ in a strong sense. At this time, the sets $X_{ON}$, $X_{OFF}$ are said to be linearly separable. If not, the sets $X_{ON}$, $X_{OFF}$ are said to be linearly unseparable.

In the learning of a binary neural network, only linearly separable patterns can be handled between two layers insofar as the McCulloch-Pitts neuron model is employed. To learn linearly unseparable patterns, therefore, it is necessary to use a neuron network of three or more layers, and to handle a linearly separable input/output relationship between the layers, so that a linearly unseparable input/output relationship can be achieved as a whole. It has already been proved that any optical input/output relationship can achieved by a neuron network of three or more layers.

In considering a learning algorithm for a neuron network of three or more layers, it is important how to determine a teaching signal.

According to the present invention, a pattern allocation process is employed to divide a linearly unseparable pattern into a plurality of linearly separable patterns and allocate and learn the linearly separable patterns between the input and hidden layers.

(2) Linearly separable allocation algorithm:
A suitable target output is given to the hidden layer for a linearly unseparable pattern to be learned. To explain such a process, a learning pattern as shown in FIG. 4 is provided.

Figure 4:
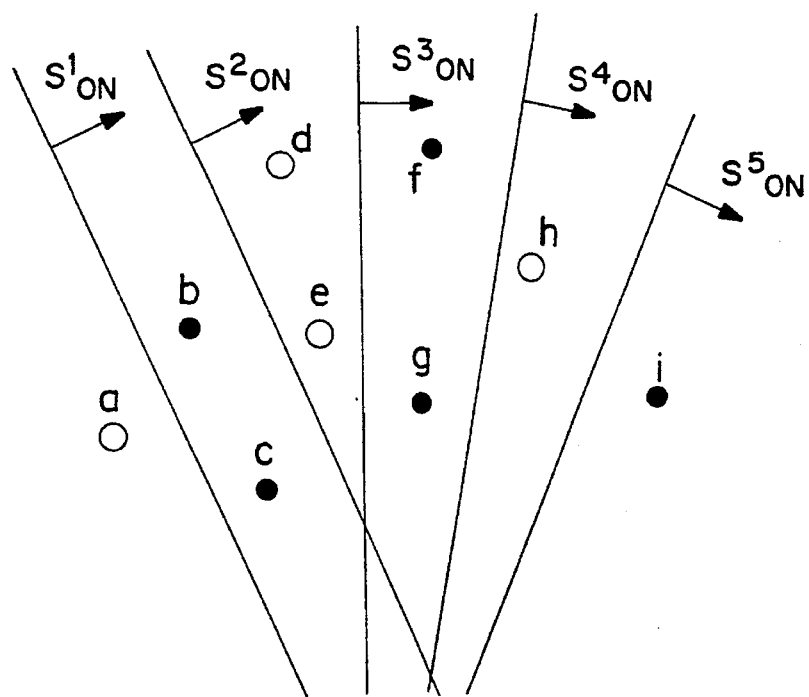
FIG. 4 is a diagram showing a linearly separable allocation process.

FIG. 4 shows a linearly separable allocation by way of example. Specifically, in a general x (vector) space, half spaces $S^k_{ON}$ (k=1, ..., 5) are determined with respect to a given pattern to be learned. Spaces indicated by the arrows in FIG. 4 are representative of the regions of $S^k_{ON}$.

If it is assumed that black dots of those denoted by a through i are ON patterns and white dots OFF patterns in FIG. 4, then the pattern sets $X_{ON}$, $X_{OFF}$ are given as follows:

$X_{ON}$={b, c, f, g, i}, $X_{OFF}$={a, d, e, f}.

Obviously, these pattern sets are linearly unseparable. If, however, hyperplanes (two-dimensionally, straight lines) are introduced as shown in FIG. 4 and half spaces (indicated by the arrows) represented by these hyperplanes are expressed by:

$$S^1_{ON}=\{x|w^{1T}x>0\},$$

$$S^5_{ON}=\{x|w^{5T}x>0\} \quad (6),$$

then whether patterns x are contained in these half spaces can be determined by checking if the state values of neurons that are expressed by:

$$x^1 = h(w^{1T}x - \theta), \quad (7)$$

$$\vdots$$

$$x^5 = h(w^{5T}x - \theta)$$

can be 1 or not. The half space $S^1_{ON}$ is realized by the first neuron $x^1$. While the target outputs (the separation of the OFF and ON patterns) of the patterns a, b, c, f, g, i are realized by $x^1$, the separation of the OFF patterns d, e, f is not realized. To realize the separation of the OFF patterns d, e, f, a difference set $S^1_{ON}-S^2_{ON}$ which is produced by subtracting $S^2_{ON}$ from $S^1_{ON}$ is considered.

The difference set $S^1_{ON}-S^2_{ON}$ can be determined by checking if the state value of a neuron expressed by:

$$x_{1,2}=h((\theta+\epsilon)x^1-2\epsilon x^2-\theta)$$

according to the neuron model (1) is 1 or not. Although desired output values for the patterns a, b, c, d, e, h are obtained by $x_{1,2}$, no satisfied outputs are obtained for the patterns f, g, i. To realize the patterns f, g, i, $S^3_{ON}$ is added, providing a set:

$$(S^1_{ON}-S^2_{ON})\cup S^3_{ON}$$

The state value of a neuron expressed by:

$$x_{1,3}=h((\theta+\epsilon)x^1-2\epsilon x^2+2\epsilon x^3-\theta)$$

obtained with respect to the above set realizes all the patterns except h.

If the above argument is applied to obtain desired outputs for all the patterns, then a neuron for giving a desired output y is expressed by:

$$y=h((\theta+\epsilon)x^1-2\epsilon x^2+2\epsilon x^3-2\epsilon x^4+2\epsilon x^5-\theta) \quad (8)$$

where $\epsilon>0$. The equations (7), (8) can be generalized respectively into:

$$x^k=h(w^{kT}x-\theta) \quad (9)$$

and $$y=h((\theta+\epsilon)x^1-2\epsilon x^2+2\epsilon x^3 \ldots -\theta) \quad (10)$$

and can be achieved by the network as shown in FIG. 3.

FIG. 3 shows the arrangement of the neural network according to the present invention. The hidden layer 2 of the neural network shown in FIG. 3 has as many neurons (k neurons) as required by the algorithm.

The weight coefficients between the output layer 3 and the hidden layer 2 have a value of $\theta+\epsilon$ only between $x^1 \sim x_{out}$, and have alternate values of $-2\epsilon$ and $2\epsilon$ for and subsequent to $x^2$.

In order to realize a linearly unseparable learning pattern, there may be determined separating hyper-planes which alternately divide only ON patterns and only OFF patterns, as described above, with respect to the given learning pattern.

Once the separating hyperplanes have been determined, the association weight between the output neuron y and the first neuron $x^1$ of the hidden layer is made larger than the threshold $\theta$ by $\epsilon$ as indicated by the equation (8), and the association weights between the output neuron y and the second and following neurons $x^2$, $x^3$, ..., $x^k$ are equalized to those having an absolute value of $2\epsilon$ with alternate signs, in order to express the state in which the ON and OFF patterns are alternately divided by the hyperplanes.

If the half plane $S^2_{ON}$ shown in FIG. 4 were directed in the opposite direction, then only $x^1$ is canceled out by $x^2$ in its ON region, and $x_{1,2}$ has the same value as $x^2$ at all times.

To prevent $S^2_{ON}$ from being determined in this way, the following relationship must be satisfied:

$$(S^{k+1}_{ON}\cap X)\subset(S^k_{ON}\cap X) \quad (11)$$

In view of the above argument and the fact that the input pattern set X is a Boolean set, the algorithm for the pattern allocation method can generally be described as follows:

Algorithm α (Linearly separable allocation algorithm):
[Step 1]

With the iteration (repetition) number being represented by k and an input vector set which will be described later on being represented by $x^k$, it is first assumed that:

$X^0$=X (input pattern set), $X^1_{ON}$=$X_{ON}$ (ON pattern set), $X^1_{OFF}$=$X_{OFF}$ (OFF pattern set), and k=1.

[Step 2]

$X^{k-1}$ is separated into a half space containing all elements of $X^k_{ON}$ and a half space containing at least one of only elements of $X^k_{OFF}$. Hyperplanes which satisfy the relationship (11), i.e., hyperplanes:

$$w^{kT}x=\theta \quad (12)$$

which satisfy the following relationship:

$$w^{kT}x>\theta, \forall x\in X^k_{ON},$$

$$w^{kT}x<\theta, \exists x\in X^k_{OFF}, \text{ and}$$

$$\{x\in X|w^{kT}x>\theta\}\subset X^{k-1} \quad (13)$$

are determined.

The set of input vectors contained in half spaces on the $X^k_{ON}$ sides of these hyperplanes is represented by $X^k$ which is given by:

$$X^k=\{x\in X|w^{kT}x>\theta\} \quad (14).$$

[Step 3]

If $X^k$=$X^k_{ON}$, then the algorithm is finished. If not, then $$X^{k+1}_{ON}=X^k-X^k_{ON}, \text{ and}$$

$$X^{k+1}_{OFF}=X^k_{ON} \quad (15)$$

The iteration number k is set to k+1, and control goes to the step 2.

The above algorithm attempts to separate the learning pattern $X^{k-1}$ into the sets $X^k_{ON}$, $X^k_{OFF}$ with the hyperplanes $w^{kT}x=\theta$ in each iteration. If the separation is successful, then the algorithm is finished. If not, the learning pattern $X^{k-1}$ is separated into a half space containing all elements of $X^k_{ON}$ and a half space containing at least one of the elements of $X^k_{OFF}$ with the hyperplanes $w^{kT}x=\theta$.

For such separation, the relationship (11) must be satisfied as described above. To meet this requirement, the conditional formula (13) which is equivalent to the relationship (11) is added to the algorithm. From this condition and the equation (14) results:

$$X^{k+1} \subset X^k,$$

and the number of elements of $X^k$ is reduced by at least one for each iteration.

The half space separated from the set $X^k_{ON}$ by the hyperplanes $w^{kT}x=\theta$ contains only the elements of $X^k_{OFF}$, and these elements are separated from $X^k$ by the hyperplanes. On the $X^k_{ON}$ sides of the hyperplanes, there exist all the elements of $X^k_{ON}$ and the remaining elements of $X^k_{OFF}$ which are mixed together without being separated. The next iteration attempts to separate portions of $X^k_{ON}$, $X^k_{OFF}$ which have not been separated in the present iteration.

At this time, not only the ON and OFF patterns are simply separated from each other, but, as described with reference to FIG. 4, hyperplanes for alternately separating the ON and OFF patterns must be determined, and $X^k_{ON}$ must be expressed using sum and difference sets alternately as indicated by the equation (10) above. To this end, target outputs for all the elements of the set $X^k_{ON}$ and some elements of the set $X^k_{OFF}$, which have not been fully separated, are reversed, providing a learning pattern in the next iteration.

The set $X^k_{ON}$ may be reversed by replacing $X^k_{ON}$ with $X^{k+1}_{OFF}$ as indicated by the second one of the equations (15). However, the reversal of the set $X^k_{OFF}$ cannot simply be effected.

Since the elements of $X^k_{OFF}$ in the half space that does not contain $X^k_{ON}$ which is separated by the hyperplanes $w^{kT}x=\theta$ have already been only an OFF or ON pattern depending on the iteration, these elements are separated from the other elements of $X^k$ on the opposite sides of the hyperplanes. These elements are considered already divided patterns in FIG. 4. Under the condition (12) above, these patterns are not contained in the ON sides of the hyperplanes that are determined in a subsequent iteration, and their outputs remain unchanged. Therefore, the elements of $X^k_{OFF}$ within the set $X^k$ where the above patterns have been excluded from X are reversed. The result produced by subtracting $X^k_{ON}$ from $X^k$ is updated as $X^{k+1}_{OFF}$, as indicated by the first one of the equations (15).

Through the above updating process, $X^k_{ON}$ and $X^k_{OFF}$ are equal to those which are produced by reversing subsets of the original ON and OFF pattern sets in each iteration, as indicated by:

$$X^k_{ON} \subset X_{ON}(\text{k is an odd number}),$$

$$X^k_{ON} \subset X_{OFF}(\text{k is an even number}) \quad (16)$$

where $X^k$ corresponds to $S^k_{ON}$ in FIG. 4, and $X_{ON}$ is expressed by:

$$X_{ON} = (X^1 - X^2) \cup \ldots \cup (X^{k-1} - X^k)(\text{k is an even number}),$$

$$X_{ON} = (X^1 - X^2) \cup \ldots \cup X^k(\text{k is an odd number}).$$

The existence of the separating hyperplanes which satisfy the relationship (13) in the step 2 of the algorithm $\alpha$ is proved by the following [Theorem 1]: [Theorem 1]:

Any single point in an n-dimensional Boolean vector set $B^n$ is separable from the remaining set in a strong sense. (Proof)

An optional element $x^a$ is taken from the set $B^n$. The remaining set which is left by taking $x^a$ from $B^n$ is denoted by U. It is checked whether $x^a$ can be expressed by the convex association of the elements of the set U.

It is assumed that $$U = \{x_1, x_2, \ldots, x_q \in B^n\}.$$

If $x^a$ can be expressed by the convex association of the elements of the set U, then $x^a$ is represented by the following equations:

$$x^a = \sum_{i=1}^{q} \mu_i x_i \quad (17)$$

$$\sum_{i=1}^{q} \mu_i = 1$$

$(\mu_i \geq 0, i=1, \ldots, q)$

The vectors $x^a, x_1, x_2, \ldots, x_q$ have elements of 0 or 1, and are all different from each other. Therefore, there exists j such that at least one of the elements $x_{1j}, x_{2j}, \ldots, x_{qj}$ of each vector has a value different from the other elements. The element of the righthand side of the first one of the equation (17):

$$\sum_{i=1}^{q} \mu_i x_i$$

has a value of $x_{ij}$, i.e., 0 or 1, if only one $\mu_i$ is 1. However, if only one $\mu_i$ is 1, then since the vectors $x^a, x_1, x_2, \ldots, x_q$ are all different from each other, the first one of the equation (17) is not satisfied. If two or more $\mu_i$ are nonzero, then in order that the inequality:

$$0 < \sum_{i=1}^{q} \mu_i x_{ij} < 1 \quad (18)$$

is not satisfied with respect to all j, but $$\sum_{i=1}^{q} \mu_i x_i$$

has a value of 0 or 1, the vectors $x^i$ with respect to $\mu_i$ which is not 0 must all be the same. This is contrary to the fact that the vectors $x_1, x_2, \ldots, x_q$ are all different from each other. Therefore, there is no $\mu_i$, i=1, $\ldots$, q which would satisfy the equations (17). Consequently, $x^a$ is not expressed by the convex association of the elements of the set U, and is not contained in the convex hull of the set U.

It can be said from the above discussion that the convex hull of the set U does not contain $x^a$. This fact, together with the following separation theorem, indicates that the convex hull of the set U and $x^a$ can be separated by hyperplanes.
[Separation theorem]

It is assumed that $\Gamma$ and $\Lambda$ are two convex sets which are not empty, with $\Gamma$ being compact and $\Lambda$ being closed. If the convex sets $\Gamma$ and $\Lambda$ do not intersect with each other, then there exists a plane $\{x | x \in R^n, c.x = \alpha\}$ $(c \neq 0)$ which separates the convex sets $\Gamma$ and $\Lambda$ from each other in a strong sense, and vice versa. Stated otherwise, the relationship:

$$\Gamma \cap \Lambda = 0 \longleftrightarrow \begin{bmatrix} \exists_{c \neq 0} \text{ and} \\ \alpha: x \in \Gamma \to cx < \alpha \\ x \in \Lambda \to cx > \alpha \end{bmatrix}$$

is satisfied.

The fact that the convex hull of the set U and $x^a$ can be separated by hyperplanes is equivalent to the fact that the set U and $x^a$ can be separated by hyperplanes. However, it is generally not easy to determine the hyperplanes $w^{kT}x=\theta$. Instead of directly determining the hyperplanes $w^{kT}x=\theta$, some of the OFF patterns of the original patterns are replaced with ON patterns to define half spaces for determining these hyperplanes. These patterns must of necessity be linearly separable. According to the present invention, the above separating hyperplanes are obtained by giving these patterns to the hidden layer neurons for learning.

Inasmuch as a plurality of linearly separable patterns thus generated with respect to the original pattern are allocated to the hidden layer neurons for learning, this process is called "Linearly Separable Allocation Method" which will be referred to as "LISA" in short.

(3) Determination of separating hyperplanes:

According to Theorem 1, how separating hyperplanes which satisfy the conditions of the step 2 of the algorithm α are determined becomes the next problem (original problem), which is equivalent to the determination of w expressed by the relationship (4) above.

It is assumed, for example, that in the event a given pattern is not linearly separable, a pattern set which makes the given pattern linearly unseparable is obtained. By replacing ON and OFF patterns of the pattern set thus obtained, the pattern as a whole can be made linearly separable. In the present invention, the pattern set which makes the given pattern linearly unseparable is called "Linearly Unseparable Core Pattern Set", which will be referred to as "LUCPS" in short.

A "dual problem" which serves as a basis for defining LUCPS will hereinafter be described below, and then an "optimization problem with respect to an original problem" will be derived for actually determining LUCPS. Furthermore, the relationship between optimization conditions for the optimization problem and linearly unseparable core patterns, and the process of extracting LUCPS will also be described below.

(3)-1 Dual problem:

In a preparatory step, suffix sets $I_{ON}$, $I_{OFF}$ are produced from the ON pattern set $X_{ON}$ and the OFF pattern set $X_{OFF}$ as follows:

$I_{ON}=\{i | x_i \in X_{ON}\}$, $I_{OFF}=\{i | x_i \in X_{OFF}\}$.

Auxiliary Theorem 1, given below, is applied to the original problem (4), deriving Theorem 2.

[Auxiliary Theorem 1]

Given a matrix $A \in R^{m*n}$ and a vector $b \in R^m$, I. there is a solution $x \in R^n$ for $Ax>b$, or II. there is a solution $y \in R^m$ for $A^Ty=0$, $b^Ty \geq 0$, $y>0$. However, the statements I, II do not hold true at the same time. $y>0$ indicates that all elements of y are 0 or more and at least one element is not 0.

(Proof)

The statement I is equivalent to I'. there is a solution $x \in R^n$ ($\xi \in R$) for $\xi>0$, $Ax>b\xi$. If Gordon's theorem is applied to the statement I', then it is true or II'. there is a solution y for $A^Ty=0$, $(y^T, b^T y)>0$. However, the statements I', II' do not hold true at the same time.

If y=0, since $b^T y=0$, $(y^T, b^T y)>0$ has the same value as $y^T>0$, $b^T y)>0$.

Therefore, either the statement I is true or the statement II is true.

[Theorem II]

With respect to θ having a certain fixed positive value,

I. there is a solution w for $x^T_i w>\theta$, $i \in I_{ON}$ $x^T_i w<\theta$, $i \in I_{OFF}$, or II. there is a solution λ for $$\sum_{i \in I_{ON}} \lambda_i x_i = \sum_{i \in I_{OFF}} \lambda_i x_i \qquad (19)$$

$$\sum_{i \in I_{ON}} \lambda_i \geq \sum_{i \in I_{OFF}} \lambda_i, \lambda \geq 0$$

However, the statements I, II do not hold true at the same time.

(Proof)

A learning pattern matrix $V \in R^{M*N}$ is generated as follows:

$$v_i = \begin{cases} x_i & (i \in I_{ON}) \\ -x_i & (i \in I_{OFF}) \end{cases} \qquad (20)$$

From vi, (i=1, 2, ..., m), a matrix V is produced as follows:

$$V = \begin{bmatrix} v_1^T \\ v_2^T \\ \cdot \\ \cdot \\ \cdot \\ v_m^T \end{bmatrix} \qquad (21)$$

Likewise, $$\gamma_i = \begin{cases} \theta & (i \in I_{ON}) \\ -\theta & (i \in I_{OFF}) \end{cases} \qquad (22)$$

Then, the statement I is equivalent to I'. there is a solution w for $Vw>\gamma$. From Auxiliary Theorem 1, the statement I' holds true, or II'. there is a solution λ for $V^T\lambda=0$, $\lambda^T\lambda \geq 0$, $\lambda>0$. However, the statements I', II' do not hold true at the same time.

Using the equation (21), the statement II' is rewritten as follows:

$$\sum_i \lambda_i v_i = 0$$

$$\sum_i \lambda_i \gamma_i \geq 0$$

$$\lambda > 0$$

Furthermore, from the equations (20), (22), $$\sum_{i \in I_{ON}} \lambda_i x_i = \sum_{i \in I_{OFF}} \lambda_i x_i \qquad (23)$$

$$\sum_{i \in I_{ON}} \lambda_i \theta \geq \sum_{i \in I_{OFF}} \lambda_i \theta$$

$$\lambda > 0$$

Since θ is a fixed positive number, the second one of the equations (23) becomes:

$$\sum_{i \in I_{ON}} \lambda_i \geq \sum_{i \in I_{OFF}} \lambda_i$$

Therefore, the statement I is true or the statement II is true.

Since the solutions do not exist at the same time, the problem expressed by the equations (19) is called a dual problem for the original problem (4). The solution λ to the dual problem (17) can be regarded as a positive association coefficient determined such that linear combinations of ON, OFF pattern vectors are equal to each other, and indicates that the sum of association coefficients with respect to ON patterns is equal to or greater than the sum of association coefficients with respect to OFF patterns.

The dual problem can be rewritten as follows:

$$\left.\begin{array}{c} c \sum\limits_{i \in I_{ON}} \mu_i x_i = \sum\limits_{i \in I_{OFF}} \mu_i x_i \\ \sum\limits_{i \in I_{ON}} \mu_i = \sum\limits_{i \in I_{OFF}} \mu_i = 1 \\ \mu \geq 0, c \geq 1 \end{array}\right\} \quad (24)$$

The equations (24) show that they have a solution $\mu$ when some of the convex associations of the ON pattern set $X_{ON}$ are contained in a cone which is made up of the convex associations of the OFF pattern set $X_{OFF}$ and the origin, as schematically shown in FIG. 5.

Figure 5A:
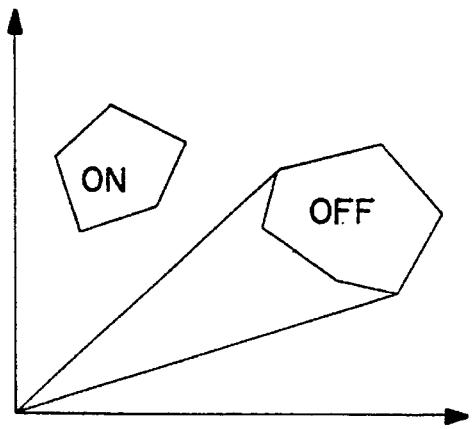
FIGS. 5(a) and 5(b) are diagrams showing the positional relationship between two pattern sets in a state variable space of input neurons.
Figure 5B:
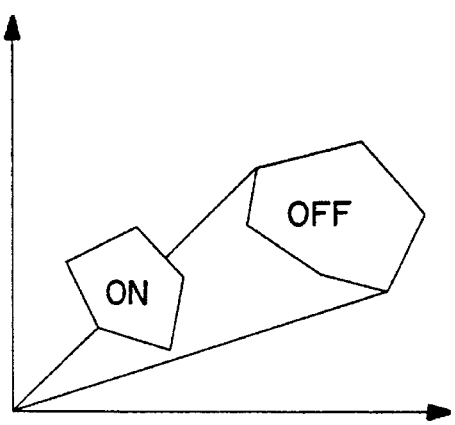

FIGS. 5(a) and 5(b) show the meaning of a dual problem in an x space. If convex associations of an ON pattern set are contained in a cone made up of the origin and the convex associations of an OFF pattern set, then the dual problem has a solution and the original problem has no solution. In FIG. 5(a), the dual problem has no solution, and the original problem has a solution. In FIG. 5(b), the dual problem has a solution, and the original problem has no solution.

It can be seen from FIGS. 5(a) and 5(b) that linear separability is determined by the relative positional relationship between all patterns. However, as shown in FIGS. 6(a) and 6(b), with respect to a linearly unseparable pattern set, an original pattern can be transformed into a linearly separable pattern by replacing some ON and OFF patterns with each other in the linearly unseparable pattern set.

Figure 6A:
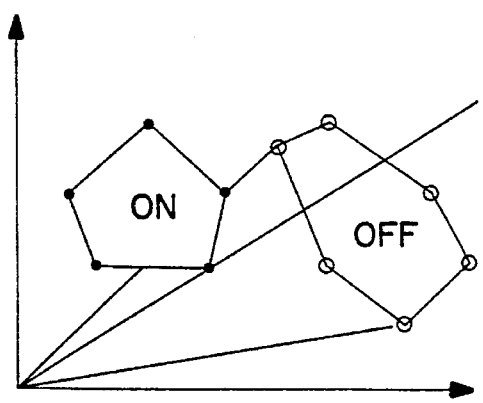
FIGS. 6(a) and 6(b) are diagrams illustrative of transformation of a linearly unseparable pattern.
Figure 6B:
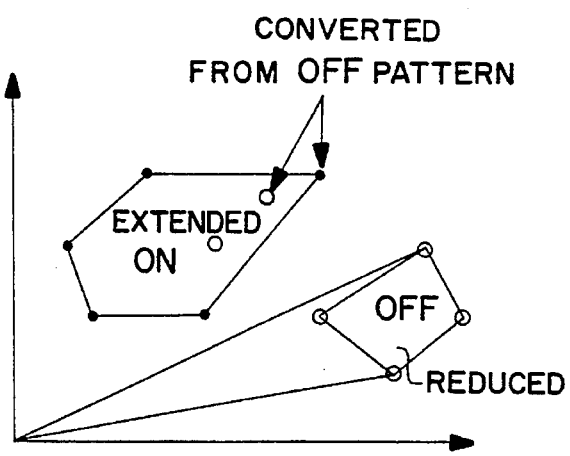

FIGS. 6(a) and 6(b) illustrate transformation of a linearly unseparable pattern. In FIG. 6(a), a cone made up of the origin and the convex associations of an OFF pattern set contain convex associations of an ON pattern set. When some (two upper left points) of the patterns of the OFF pattern set of the cone are changed to ON patterns as shown in FIG. 6(b), the cone no longer contains any ON patterns.

The fact that some convex associations of the ON pattern set $X_{ON}$ are contained in the cone made up of the origin and the convex associations of the OFF pattern set $X_{OFF}$ in FIGS. 5(a), 5(b), 6(a), and 6(b) indicates that there is a solution $\mu$ to the problem (18), and the solution $\mu$ corresponds to the solution $\lambda$ to the problem (17). The solution $\lambda$ is an association coefficient in the case where the linear combinations of the elements of $X_{ON}$, $X_{OFF}$ are the same as each other. If the components of the association coefficient $\lambda$ can be divided into 0 components and positive components, then the positive components are considered to determine the solution to the dual problem. Thus, the positive components of $\lambda$ are involved in linear separability of the original problem.

Generally, if the number of patterns is larger than the number of dimensions, then all the patterns are linearly dependent, and the solution $\lambda$ to the dual problem for most of the patterns can be positive. However, since the component value of a Boolean vector is 0 or 1, the dimensions of a space defined by the patterns is smaller than patterns of continuous values. This does not apply if the number of learning patterns is close to the number of all combinations that can be possible with original input/output patterns, though such a case does not generally occur.

If the positive component of a solution to a dual problem is determined, therefore, a linearly separable pattern set $X^{k-1}$ determined in the step 2 of the algorithm $\alpha$ should be obtained by changing OFF patterns to ON patterns. Hidden layers for achieving, through a learning process, the linearly separable pattern set $X^{k-1}$ thus obtained, and output neurons for combining those hidden layers are determined to reconstruct the original patterns according to the algorithm $\alpha$, for thereby achieving the original linearly separable patterns.

Based on the foregoing, a "linearly unseparable core pattern set" which is a pattern set as a basis for linearly unseparability is defined as follows:

[Definition 1]

A set $I_{LU}$ of patterns with respect to nonzero elements of the solution $\lambda = [\lambda_i]$ to the dual problem (17) is defined as a linearly unseparable core pattern set (LUCPS) as follows:

$I_{LU} = \{i | \lambda_i > 0\}$

It is possible to determine the solution to a dual problem by applying a condition $\lambda > 0$ to a sweeping-out method which checks if simultaneous equations are solvable or not. As the number of problem dimensions and the number of patterns increase, however, a combination explosion takes place.

Consequently, a more practical method will hereinafter takes place.

Consequently, a more practical method will hereinafter be described.

(3)-2 Optimization problem with respect to the original problem:

An optimization problem to determine a linearly unseparable core pattern set $I_{LU}$ is formulated below.

For speeding up convergence, the following transformation functions are introduced into ON and OFF patterns:

$$\left.\begin{array}{l} h_{ON}(z) = \left\{\begin{array}{ll} 1, & z \geq 0 \\ 1+z, & z < 0 \end{array}\right. \\ h_{OFF}(z) = \left\{\begin{array}{ll} z, & z \geq 0 \\ 0, & z < 0 \end{array}\right. \end{array}\right\} \quad (25)$$

Figure 7A:
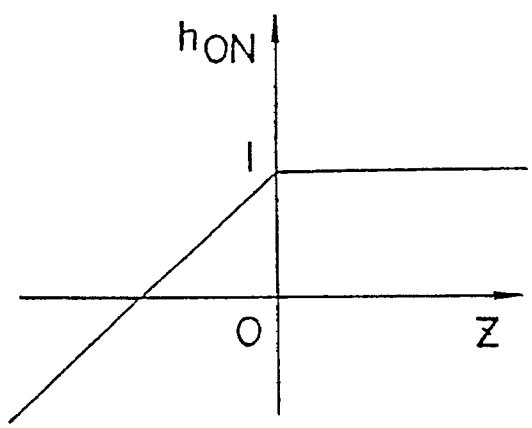
FIGS. 7(a) and 7(b) are diagrams showing transformation functions for two kinds of patterns.
Figure 7B:
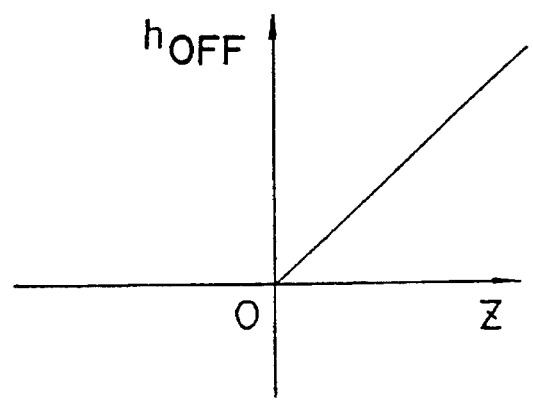

These functions are represented as shown in FIGS. 7(a) and 7(b), and cannot be differentiated when $z=0$.

$h_{ON}$ is provided by modifying the transformation function according to the equations (2), and a portion thereof where the argument is positive, i.e., the original problem is admissible is equal to h. A portion where the argument is negative, i.e., the original problem is inadmissible is linear.

In sigmoid functions, a gradient exists only in the vicinity of a region where the argument is 0. In the above transformation functions, a constant gradient is present at all times in a portion where the original problem is inadmissible. Therefore, irrespective of the value of the association weight $w^k$, stable and quick convergence can be achieved in the learning process. For the same reasons, $h_{OFF}$ is expressed according to the second one of the equations (25).

The transformation functions $h_{ON}$, $h_{OFF}$ are allocated to the ON and OFF patterns, as described above, and the patterns are individually considered. By maximizing $h_{ON}$, there are determined weights that realize the ON patterns, and by maximizing $h_{OFF}$, there are determined weights that realize the OFF patterns. The following optimization problem will be considered in order to determine the weights for realizing the ON and OFF patterns:

$$\max_w \left( \sum_{x \in X_{ON}} h_{ON}(x^T w - \theta) - \sum_{x \in X_{OFF}} h_{OFF}(x^T w - \theta) \right) \quad (26)$$

With the sums of $h_{ON}$, $-h_{OFF}$ being maximized, the solution search is conducted toward regions where the output is 1 with respect to the ON patterns, and also toward regions where the output is 0 with respect to the OFF patterns. If the input pattern is linearly separable, then the solution of the next problem gives an admissible solution to the original problem (4). The formula (26) is a maximization problem for the function:

$$\phi(w) = \sum_{x \in X_{ON}} h_{ON}(x^T w - \theta) - \sum_{x \in X_{OFF}} h_{OFF}(x^T w - \theta) \quad (27)$$

Since $h_{ON}$ is a concave function and $h_{OFF}$ is a convex function, $\phi$ is a concave function with respect to w, and the local maximum of $\phi$ is equal to a global maximum. The problem (20) can be solved by a gradient method for an undifferentiable optimization problem.

(3)—3 Relationship between an optimization condition and a dual problem:

An optimization condition is determined from an optimum solution to the optimization problem (20), and it will be indicated that the coefficient of the optimization condition is equal to the solution to a dual problem. It can be seen that if the original problem (4) is linearly unseparable, a pattern of nonzero (positive) coefficients of an optimization condition equation with respect to the optimum solution to the problem (20), i.e., LUCPS, can be determined.

The optimization condition for the problem (20) will first be described below.

The function $\phi$ is a partially undifferentiable function, and has no gradient in that it is undifferentiable. However, it has a hypogradient or a general gradient under certain conditions. The definition of a hypogradient and an optimization condition for an optimization problem will be described below.

In the optimization problem $$\max_x f(x) \quad (28)$$

regarding $x \in R^n$ of a concave function f, if the concave function f is undifferentiable with respect to $x_0$, the hypogradient is a set of z which satisfies:

$$f(x) \leq f(x_0) + z^T(x - x_0), \forall x \in X$$

Using that set $\partial f(x_0)$, the optimization condition for the optimization problem is expressed by:

$$0 \in \partial f(x_0)$$

As the functions $h_{ON}$, $-h_{OFF}$ are concave in a one-dimensional space $R^1$, there is obviously a hypogradient of $\phi$ in $w \in \text{int} X$. Using a hypogradient set $\partial \phi$ of $\phi$, the optimization condition for optimizing an undifferentiable concave function can be expressed as follows:

$$0 \in \partial \phi(w^0) \quad (29)$$

where $w^0$ represents an optimum solution.

If $\phi_{ON}(w;x) = h_{ON}(x^T w - \theta)$, and
$\phi_{OFF}(w;x) = h_{OFF}(x^T w - \theta)$,
then $$\partial \phi(w) = \left\{ \sum_{x \in X_{ON}} \nabla \phi_{ON}(w; x) - \sum_{x \in X_{OFF}} \nabla \phi_{OFF}(w; x) \,\middle|\, \right. \quad (30)$$

$\nabla \phi_{ON}(w; x) \in \partial \phi_{ON}(w; x),$ $\nabla \phi_{OFF}(w; x) \in \partial \phi_{OFF}(w; x)\}$ where $$\nabla \phi_{ON}(w; x) = \{0\} \quad (x^T w > \theta) \quad (31)$$
$$\nabla \phi_{ON}(w; x) = co\{0, x\} \quad (x^T w = \theta)$$
$$\nabla \phi_{ON}(w; x) = \{x\} \quad (x^T w < \theta)$$
$$\nabla \phi_{OFF}(w; x) = \{x\} \quad (x^T w > \theta)$$
$$\nabla \phi_{OFF}(w; x) = co\{0, x\} \quad (x^T w = \theta)$$
$$\nabla \phi_{OFF}(w; x) = \{0\} \quad (x^T w < \theta)$$

co indicates a convex hull defined as follows:

$$co\{0, x\} = \{\lambda x | 0 \leq \lambda \leq 1\} \quad (32)$$

From the equations (31), (32), $$\partial \phi_{ON}(w; x_i) = \{\lambda_i x_i\} \quad (i \in I_{ON}) \quad (33)$$
$$\partial \phi_{OFF}(w; x_i) = \{\lambda_i x_i\} \quad (i \in I_{OFF})$$

where
with respect to $i \in I_{ON}$, $$\lambda_i = 0 \quad (x^T w > \theta)$$
$$\lambda_i = [0, 1] \quad (x^T w = 0)$$
$$\lambda_i = 1 \quad (x^T w < \theta)$$

with respect to $i \in I_{OFF}$, $$\lambda_i = 1 \quad (x^T w > \theta) \quad (34)$$
$$\lambda_i = [0, 1] \quad (x^T w = \theta)$$
$$\lambda_i = 0 \quad (x^T w < \theta)$$

From the equations (30), (33), (34), $$\sum_{i \in I_{ON}} \lambda_i x_i - \sum_{i \in X_{OFF}} \lambda_i x_i \in \partial \phi(w) \quad (35)$$

From the equations (29) and (35), there is $\lambda_i$ which satisfies the equations (34) and the following equation:

$$\sum_{i \in I_{ON}} \lambda_i x_i - \sum_{i \in I_{OFF}} \lambda_i x_i = 0 \quad (36)$$

Furthermore, $0 \leq \lambda_i \leq 1$ is satisfied with respect to all i's.
If the original problem (4) is linearly separable, then $\partial \phi_{ON}(w; x_i) = \{0\}, i \in I_{ON}$ $\partial \phi_{OFF}(w; x_i) = \{0\}, i \in I_{OFF}$ in the optimum solution $w^0$ to the problem (20).

If the original problem (4) is linearly unseparable, then since an inadmissible pattern exists, the hypogradient set $\partial \phi_{ON}$ or $-\partial \phi_{OFF}$ has nonzero elements as can be understood from the equations (34). Therefore, there exists nonzero $\lambda_i$ which satisfies the equation (36). That is, $$\lambda > 0 \quad (37)$$

In order to introduce the relationship between $\lambda$ which satisfies the optimization condition formula and the dual problem (17), the following theorem is obtained:

[Theorem 3]:

If there is no admissible solution w to the original problem (4):

$x_i^T w - \theta > 0, i \in I_{ON}$ $x_i^T w - \theta < 0, i \in I_{OFF}$ and if the following equation is satisfied:

$$\sum_{i \in I_{OFF}} \lambda_i x_i - \sum_{i \in I_{ON}} \lambda_i x_i = 0, \lambda > 0$$

then the following relationship is satisfied:

$$\sum_{i \in I_{ON}} \lambda_i \geq \sum_{i \in I_{OFF}} \lambda_i$$

(Proof)

The foregoing is apparent from the following Auxiliary Theorem 2:

If there is no solution x for Ax>b with respect to a given matrix $A \in R^{m*n}$, then the solution $y \in R^p$ for
$A^T y = 0, y > 0$
satisfies
$b^T y \geq 0$ (Proof)

When there is a solution $y^0$ to
$A^T y = 0, y > 0$
$b^T y^0 < 0$ which is a negation of $b^T y^0 \geq 0$ is assumed, introducing a contradiction.

Since the fact that there is no solution x for Ax>b is equivalent to the fact that there is a solution y for
$A^T y = 0, y > 0, b^T y \geq 0,$
there is no $y^0$ for
$A^T y^0 = 0, y^0 > 0,$ and $b^T y^0 < 0$ If there is no admissible solution to the original problem (4), i.e., if the learning patterns $X_{ON}$, $X_{OFF}$ are linearly unseparable, then, from the equations (19), (34), (36), and (37) and Theorem 3, $\Gamma \subset \Lambda$ where $\Gamma$ is a set of $\lambda$ which satisfies the optimization condition equation (36) for the optimization problem (20) and the expression (37) and $\Lambda$ is a solution set for the dual problem (17). Since the solution to the dual problem (17) satisfies the optimization condition equation (36) and the expression (37), the following relationship is satisfied:

$\Gamma \supset \Lambda$

Therefore, $\Gamma = \Lambda$

Consequently, in the case where the original problem is linearly unseparable, then $\lambda$ that is determined from the optimum solution to and the optimum condition for the optimization problem (20) is equal to the solution to the dual problem.

(3)-4 Extraction of a linearly unseparable core pattern:

It can be seen from the above theory that if the original problem is linearly unseparable, then $\lambda$ that satisfies the equations (31) with respect to the solution $w^0$ to the optimization problem (20) is determined, and the positive component of $\lambda$ corresponds to a linearly unseparable core pattern that corresponds to $w^0$. However, the problem (20) may not necessarily have an undifferentiable point, and an optimum solution may not always be determined for the problem (20). It will be shown below that LUCPS (linearly unseparable core pattern set) can be extracted even when no optimum solution is determined.

An algorithm for solving the optimization problem (20) will be described below.

Algorithm β (algorithm for solving the problem (20)):
[Step 1]

A certain initial point $w^1$ is appropriately selected, and an iteration number d is set to d=1.
[Step 2]

$h_{ON}(x^T w^d - \theta); x \in X_{ON}$ and $h_{OFF}(x^T w^d - \theta); x \in X_{OFF}$ are calculated. If there exists even one pattern $x_p$ which satisfies:

$h_{ON}(x_p^T w^d - \theta) \neq 1$, $x_p \in X_{ON}$, or
$h_{OFF}(x_p^T w^d - \theta) \neq 1$, $x_p \in X_{OFF}$ then control proceeds to a next step. If not, $w^d$ is regarded as the solution $w^0$ to the problem (20), and the algorithm is finished.
[Step 3]

With respect to p in the step 2, the following correction is made:

$$w^{d+1} = w^d + \alpha^p \Delta w^d(x_p) \tag{38}$$

where $$\alpha^p = \frac{\theta - x_p^T w^d}{\sum_{i=1}^{n} x_{pi}} \tag{39}$$

$\Delta w^d(x_p) = \nabla_w \phi_{ON}(w; x_p), x_p \in X_{ON}$
$\Delta w^d(x_p) = \nabla_w \phi_{OFF}(w; x_p), x_p \in X_{OFF}$
where $\nabla_w \phi_{ON}(w; x_p)$ and $\nabla_w \phi_{OFF}(w; x_p)$ are expressed as follows:

$\nabla_w \phi_{ON}(w; x_p) = x_p,$ $\nabla_w \phi_{OFF}(w; x_p) = x_p \tag{40}$

[Step 4]

The algorithm is finished if either one of the following finishing conditions a, d, e is satisfied. If not, then $w^d \leftarrow w_o$ when the iteration number $d = d_0$ where $d_0$ is a certain number. When $d > d_0$, the algorithm is finished if the finishing condition b is satisfied. Otherwise, the algorithm is finished if the finishing condition c is satisfied. When the iteration number is not in any of these cases, the iteration number d is updated by $d \leftarrow d+1$, and control goes back to the step 2. The finishing conditions a through e are defined as follows:

(Finishing condition a) A sufficiently large positive integer $j_0$ is determined, and the algorithm is finished if there is j which satisfies:

$|w^d - w^{d-j}| < \zeta$ with respect to $j = 1, \ldots, j_0$ where $\zeta$ is a sufficiently small positive number.

(Finishing condition b) The algorithm is finished if $w^d = w_0$ when $d > d_0$.

(Finishing condition c) The algorithm is finished when $d > d_0$. $d_0$ is a positive integer which is somewhat larger than the maximum iteration number at the time an n-dimensional linearly separable problem is solved.

(Finishing condition d) The algorithm is finished if a hypogradient set $\partial \phi(w^d)$ of a function $\phi$ with respect to $w^d$ contains a zero vector.

(Finishing condition e) The algorithm is finished if $\phi(w^d) < \phi(w^{d-1})$.

The finishing conditions are most difficult to determine in the algorithms used in the present invention. Whether an actual pattern is linearly separable or not is determined based on the finishing conditions. The finishing conditions a, b serve to check if a change $\Delta w^d$ in w in one cycle or more becomes 0 or not when the value d becomes larger than a certain value $d_0$, i.e., when the convergence has sufficiently been in process. The finishing condition d is used to halt the algorithm when an actual pattern cannot be determined as to whether it is linearly unseparable or not, based on the finishing conditions a, b. The learning time in the present invention is governed by whether the finishing conditions are good or bad. In a numerical example described later on, $d_0 = 3$.

The method of determining the step width according to the equation (39) is based on the idea that a minimum width required is given so as to make an inadmissible pattern $x_p$ at a present point $w^d$ admissible with respect to the original problem.

The transformation functions $h_{ON}$, $h_{OFF}$ are essentially undifferentiable at 0, and a hypogradient must be given thereto as indicated by the equations (31). However, it is generally difficult to positively determine a hypogradient set. To avoid the difficulty, a hypogradient is given according to the equations (40) in view of the nature of the neuron transformation function.

If original input/output patterns are linearly separable, i.e., if the original problem (4) has an admissible solution, there is determined a solution $w^0$ for achieving all input/output patterns in the same manner as the learning process for perceptrons, according to the algorithm β. If original input/output patterns are linearly unseparable, a λ set obtained from the optimization condition for the problem (20) is equal to a solution set for a dual problem. The path of $w^d$ converges up to near an optimum solution that satisfies the optimization condition equation (36) for the problem (2) and the expression (37), but does not stop at the optimum solution, and vibrates in or around the optimum solution. Even if an optimum solution is obtained, it is difficult to positively determine a hypogradient set of an object function of the problem (20). Therefore, it is also difficult to determine whether $w^d$ satisfies the optimization condition.

The algorithm according to the present invention do not need an optimum solution, but may determine LUCPS (linearly unseparable core pattern set). In most cases, even if all LUCPSs are not obtained, a subset thereof may be obtained and an OFF pattern to be transformed may be selected from the subset.

According to the algorithm β, $w^d$ vibrates in the vicinity of an optimum solution with respect to a sufficiently large d ($d>d_0$). In the vicinity of an optimum solution, an inadmissible component of the original problem (4) is considered to correspond to a linearly unseparable core pattern.

According to the method (32) of determining a corrected step width with respect to an inadmissible pattern, the step width with respect to the present inadmissible pattern is determined such that an output for at least the present pattern is equalized to a target output.

Then, interference occurs between linearly unseparable core patterns, and $w^d$ vibrates between regions of w which satisfy a target output between these patterns. Thus, if $w^d$ starts to vibrate in the vicinity of an optimum solution after it has converged to a certain extent, then components or patterns in the equation (4) which are made inadmissible subsequently are considered to be an element of LUCPS. The LUCPS should be obtained by registering these patterns.

A suitable OFF pattern is selected from the obtained pattern set, and changed to an ON pattern, thus reducing the number of elements of the LUCPS.

If the conditional expression (13) of the algorithm for the linearly separable allocation method described above under (2) is not satisfied, then any reduction in the number of elements of $X^k$ is not assured. Selection of an OFF pattern to be transformed in order to satisfy the above condition is made according to the following Rule A or Rule B:

[Rule A]

An OFF pattern which is most distant from the origin shall be selected.

[Rule B]

An OFF pattern whose inner product with $w^d$ is largest shall be selected.

Linearly separable patterns are obtained by transforming patterns which cause linear unseparability, one by one.

Separating hyperplanes for the linearly separable allocation algorithm are determined from the obtained linearly separable patterns.

The above process may be incorporated in the linearly separable allocation algorithm α.

Figure 8:
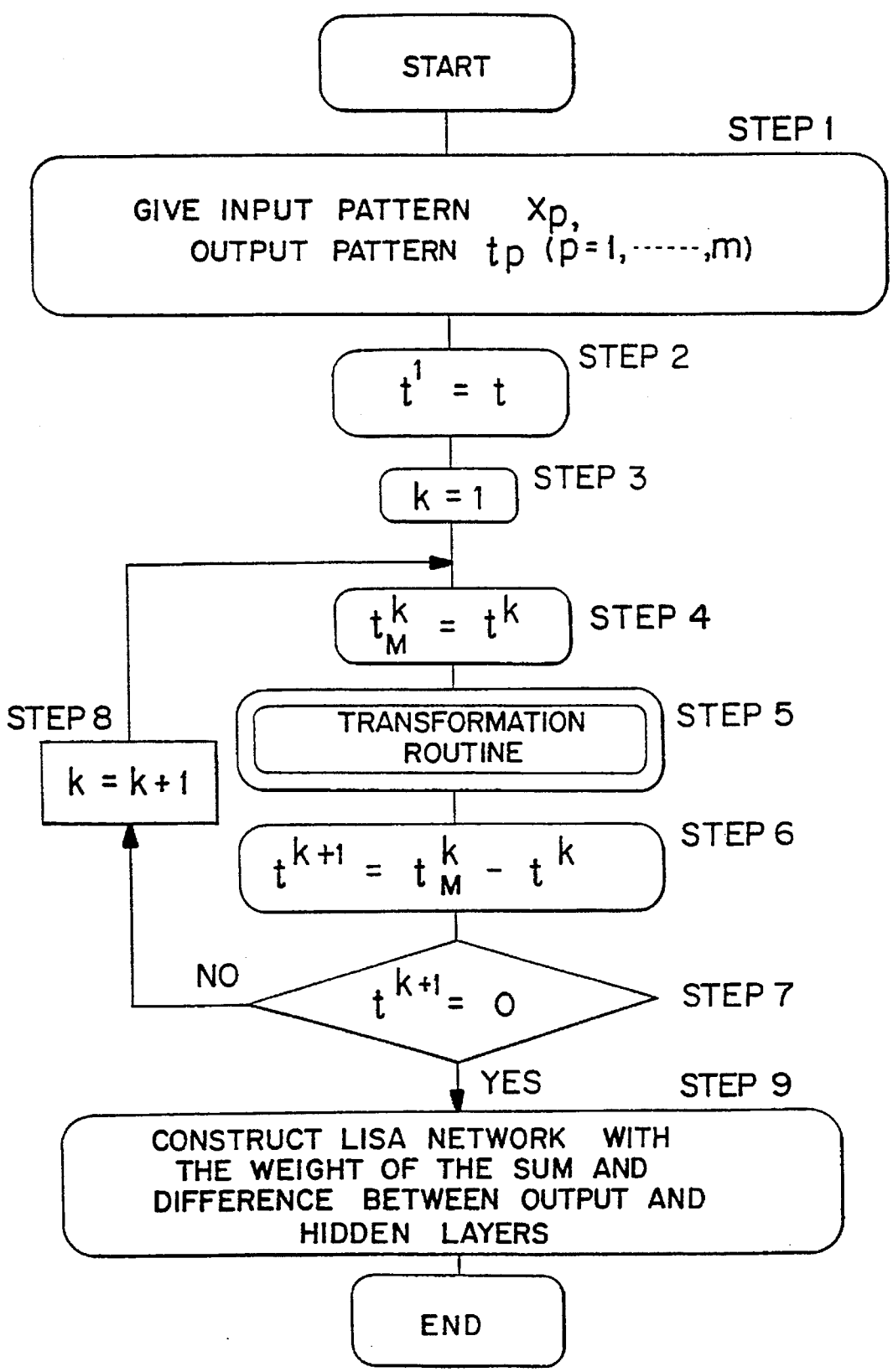
FIG. 8 is a flowchart of a learning method according to the present invention.
Figure 9:
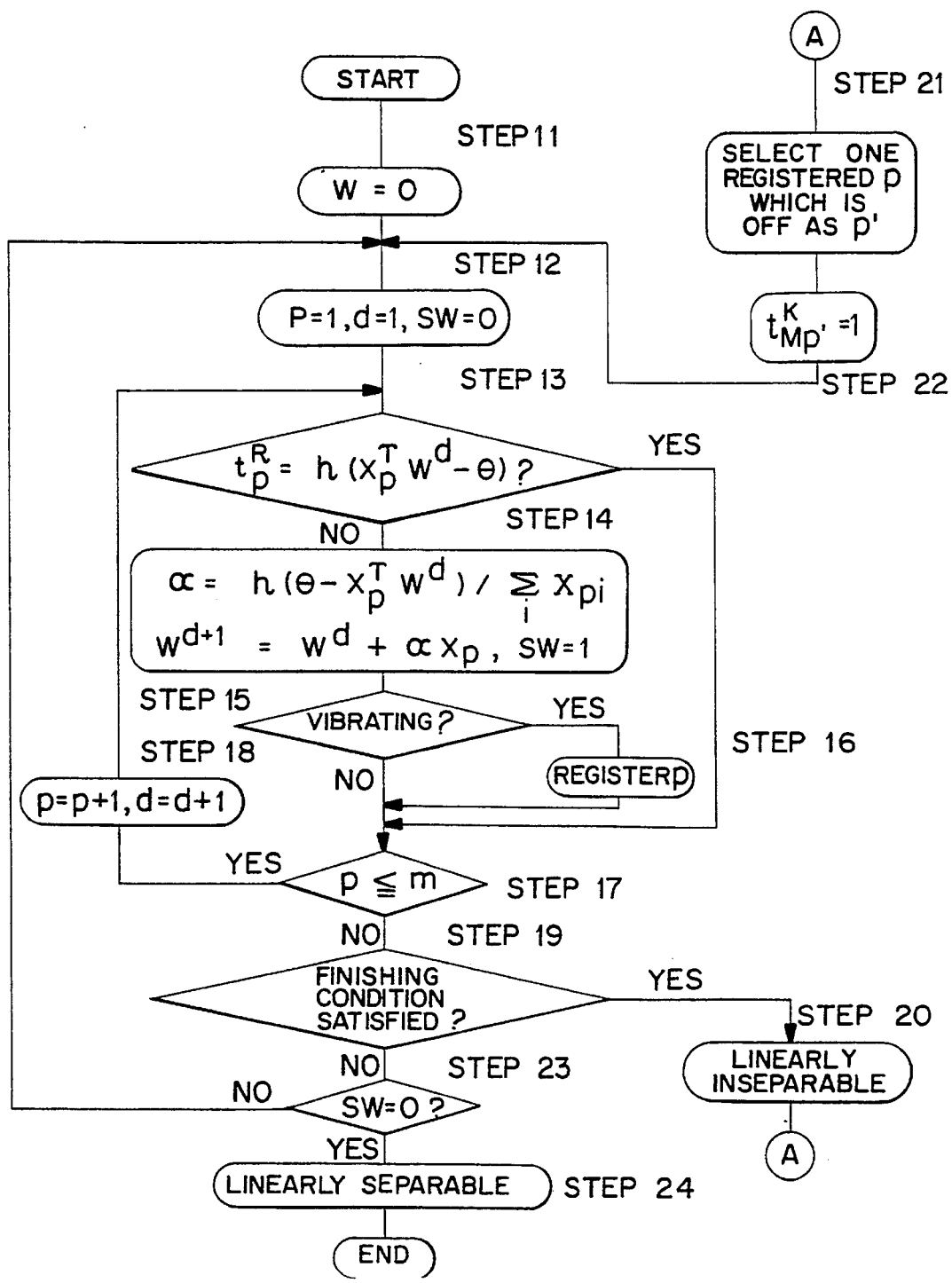
FIG. 9 is a flowchart of a transformation routine in the flowchart of FIG. 8.

FIGS. 8 and 9 are flowcharts of a learning method according to the present invention.

As shown in FIG. 8, first, input patterns (vectors) $x_p$ and output patterns (scalars) $t_p$ (p is the number of m patterns) are given in a step 1. Then, a target output pattern t is set to an initial value $t^1$ in a step 2, and an iteration number k is set to 1 in a step 3. A target output pattern $t^k$ with respect to a kth hidden neuron is substituted in a linearly separable output pattern $t^k_M$ in a step 4, and a transformation routine is carried out in a step 5. The transformation routine will be described later with reference to FIG. 9.

Thereafter, a differential pattern which is produced by subtracting $t^k$ from $t^k_M$ is given as a (k+1)th output pattern $t^{k+1}$ in a step 6, and the steps 4 through 6, are repeated until $t^{k+1}=0$. Specifically, after the step 6, a step 7 determines whether $t^{k+1}=0$. If $t^{k+1}\neq 0$, then the iteration number k is incremented by 1 in a step 8, and control returns to the step 4.

When $t^{k+1}=0$, the neutral network shown in FIG. 2 is constructed with the weights (association coefficients) determined as described above between output and hidden layers, in a step 9.

The transformation routine will be described below.

As shown in FIG. 9, first a weight $w^1$ is set to 0 in a step 11. Then, a pattern number p and the iteration number d of the algorithm β are set to 1, and a variable sw indicative of a wrong answer (described later) is set to 0 in a step 12. A step 13 determines whether the linearly separable target output $t^k_M$ agrees with an actual output h ($x_p^T w^d - \theta$) with respect to a pattern p. If not, then the weight $w^d$ is altered or corrected according to the equations (38) and (39), and the variable sw is set to 1 in a step 14. Thereafter, a step 15 determines whether $w^d$ is vibrating ($d>d^0$) or not. If vibrating, the pattern p is registered in a step 16.

The steps 13 through 16 are executed with respect to m patterns. Specifically, after the pattern p is registered, or if the linearly separable target output $t^k_M$ agrees with an actual output h ($x_p^T w^d - \theta$), a step 17 determines whether $p \leq m$ or not. If $p \leq m$, then p and d are incremented by 1 in a step 18, and control goes back to the step 13.

When p exceeds m, a step 19 determines whether either one of the finishing conditions a~e is satisfied or not. If satisfied, then the pattern p is registered as a linearly unseparable pattern in a step 20. One OFF pattern is selected from the registered patterns as a pattern p' in a step 21. A target output $t^k_{Mp'}$ for the selected pattern p' is set to 1 in a step 22, from which the processing goes back to the step 12.

If none of the finishing conditions are satisfied in the step 19, then a step 23 determines whether the variable sw=0 or not. If not, control returns to the step 12, and if yes, the pattern is registered as linearly separable in a step 24.

(4) Algorithm for the linearly separable allocation method (LISA):

(4)-1 Algorithm:

The linearly separable allocation algorithm α described above under (2) and the algorithm β for solving the optimization problem described under (3)-4 are joined to each other, making algorithms γ, $\delta^k$ as described below.

Algorithm γ:

[Step 1]

$X^1_{ON}=X_{ON}$, $X^1_{OFF}=X_{OFF}$. The iteration number k is set to k=1.

[Step 2]
$x^k = X^k_{ON}$.
[Step 3]
Using the algorithm $\delta^k$ (described later on), it is checked whether $X^k_{ON}$, $X^k - X^k_{ON}$ are linearly separable or not.
[Step 4]
If linearly separable, then $w^o$ obtained by the algorithm $\delta^k$ is set to $w^k$, and the processing goes to a step 5. If linearly unseparable, then an element $x_m$ whose norm is maximum is selected from an intersection of sets $\{x_i | x_i \epsilon I_{LU}\}$, $\{X^k - X^k_{ON}\}$ obtained according to the algorithm $\delta^k$. After $X^k \leftarrow X^k \cup \{x_m\}$, control goes back to the step 4.
[Step 5]
If $X^k = X^k_{ON}$, then control goes to a step 6. If not, then
$X^{k+1}_{ON} \leftarrow X^k - X^k_{ON}$,
$X^{k+1}_{OFF} \leftarrow X^k_{ON}$
and the iteration number k is updated into k+1. The processing then goes to the step 2.
[Step 6]
The three-layer neural network model expressed by the equations (9), (10) is constructed, and the algorithm γ is ended.
Algorithm $\delta^k$:
[Step 1]
A certain initial point $w^1$ is selected. $Y^1_{ON} = X^k_{ON}$, $Y^1_{OFF} = X^k - X^k_{ON}$, and the linearly unseparable core pattern set $I_{LU} = \Phi$ (empty set). The iteration number d is set to d=1.
[Step 2]
$h_{ON}(x^T w^d - \theta)$ $[x \epsilon Y^k_{ON}]$ and $h_{OFF}(x^T w^d - \theta)$ $[x \epsilon Y^k_{OFF}]$ are calculated. If even one pattern p exists which satisfies:
$h_{ON}(x_p^T w^d - \theta) \neq 1 (x_p \epsilon Y^k_{ON})$, or
$h_{OFF}(x_p^T w^d - \theta) \neq 0 (x_p \epsilon Y^k_{OFF})$,
then control goes to a next step. If not, $w^d$ is set to $w^o$, and the algorithm is ended.
[Step 3]
All patterns p in the step 2 are corrected according to the equations (38), (39). If $d > d_0$, then the patterns p are added to the linearly unseparable core pattern set $I_{LU}$. That is,
$I_{LU} \leftarrow I_{LU} \cup \{p\}$
$d_0$ is a maximum value for the convergence iteration number at the time there is a solution to a predetermined original problem.
[Step 4]
If any of the finishing conditions a, d, e is satisfied, then the algorithm is finished. If not satisfied, when $d = d_0$, $w^d \leftarrow w_o$. If the finishing condition b is satisfied, then the algorithm is finished. If not, then the algorithm is finished when the finishing condition c is satisfied. If the finishing condition c is not satisfied, then $d \leftarrow d+1$, and the processing goes back to the step 2.
(4)-2 Speeding-up of algorithm:
Addition of improvements, described below, to the algorithms makes it possible to speed up the learning process.
1. The weights are calculated as integer-type weights. It is important that the threshold be not too small compared to the number of input neurons. If the threshold were too small, the iteration number would unnecessarily be increased due to a quantization error, possibly causing infinite recurrence.
2. In the step 3 of the algorithm γ, before executing the algorithm $\delta^k$, j which satisfies
$x_j \geq x_i$
with respect to $i \epsilon I_{ON}$, $j \epsilon I_{OFF}$ changes from OFF patterns to ON patterns.
The significance of the speeding-up process under 2 above is as follows:
This speeding-up process is effective to reduce the number of times that the algorithm $\delta^k$ is carried out to discover a linearly unseparable core pattern set $I_{LU}$. However, since other patterns than $I_{LU}$ may be rendered ON, the algorithm $\delta^k$ may possibly be subject to recurrence. No recurrence took place with a four-input pattern in an experiment described later on.

Figure 10A:
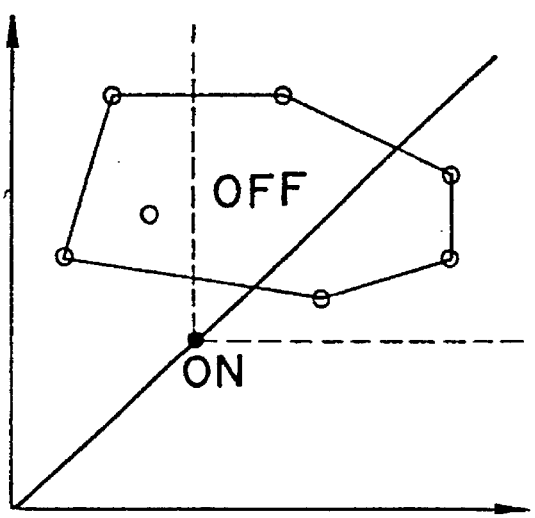
FIGS. 10(a) through 10(c) are diagrams showing a pattern transformation for speeding up algorithms.
Figure 10B:
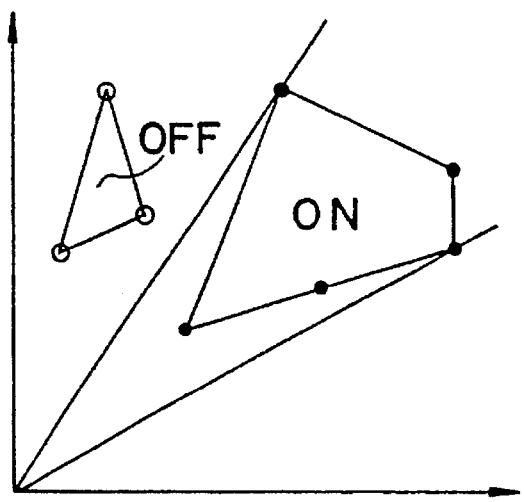
Figure 10C:
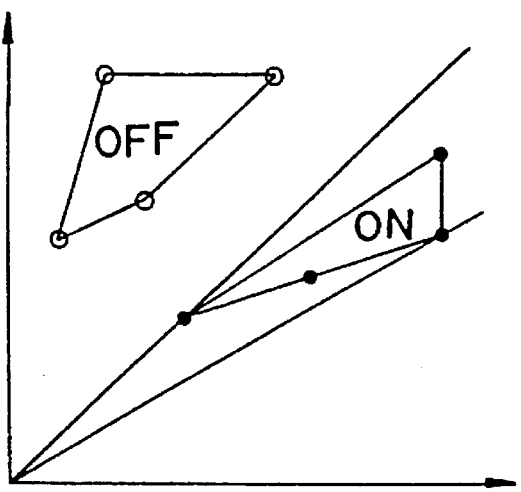

FIGS. 10(a) through 10(c) show a transformation for the speeding-up process. White dots indicate OFF patterns, and black dots ON patterns. As shown in FIG. 10(a), those OFF patterns (on the righthand or upper side of dotted lines) which are equal to or larger than the ON patterns are transformed into ON patterns. Thereafter, as shown in FIG. 10(b), the ON and OFF patterns are clearly separated from each other. However, as shown in FIG. 10(c), there is a transformation in which the number of changed patterns is smaller.

When there are an OFF pattern set and a ON pattern as shown in FIG. 10(a), since a line interconnecting the origin and the ON pattern passes through the convex hull of the OFF pattern set, these patterns are linearly unseparable. According to the above speeding-up process, all OFF patterns on the lefthand or upper side of the dotted lines are transformed into ON patterns, as shown in FIG. 10(b), and become linearly separable. This transformation is not a minimum transformation for making linearly separable patterns. The transformation may be less if effected as shown in FIG. 10(c).

Figure 11:
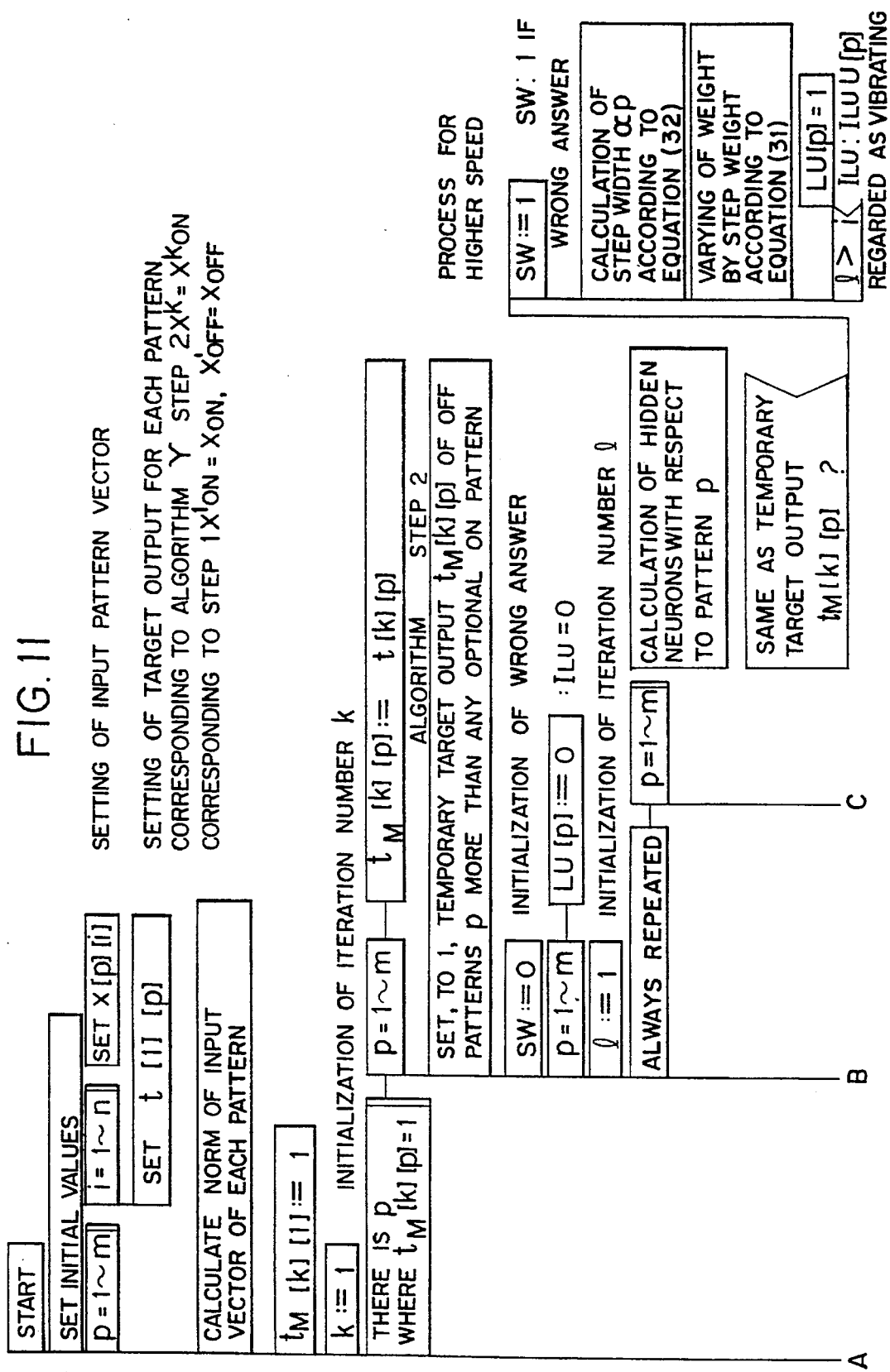
FIGS. 11 and 12 are diagrams showing all algorithms in detail.
Figure 12:
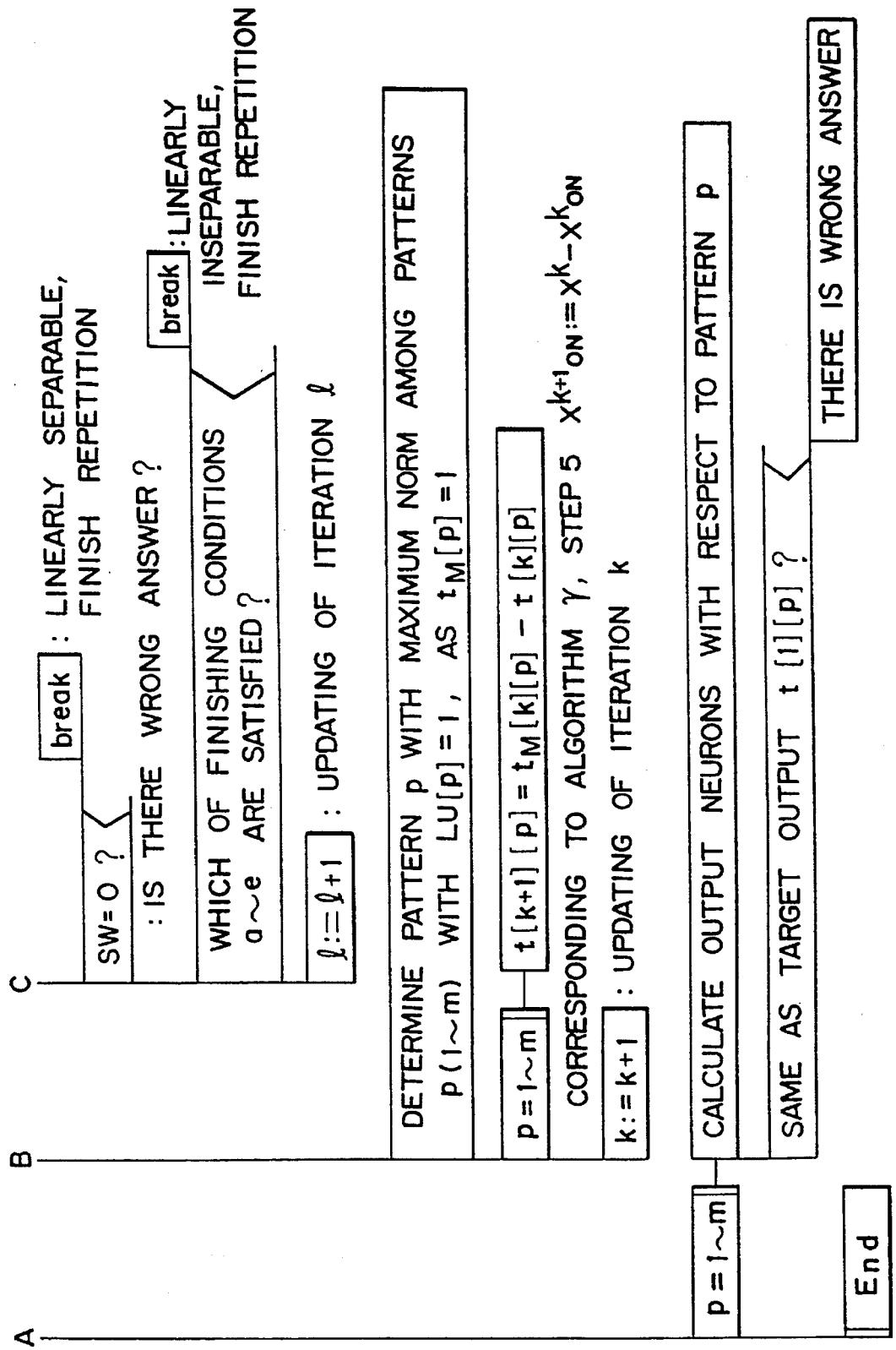
Figure 14:
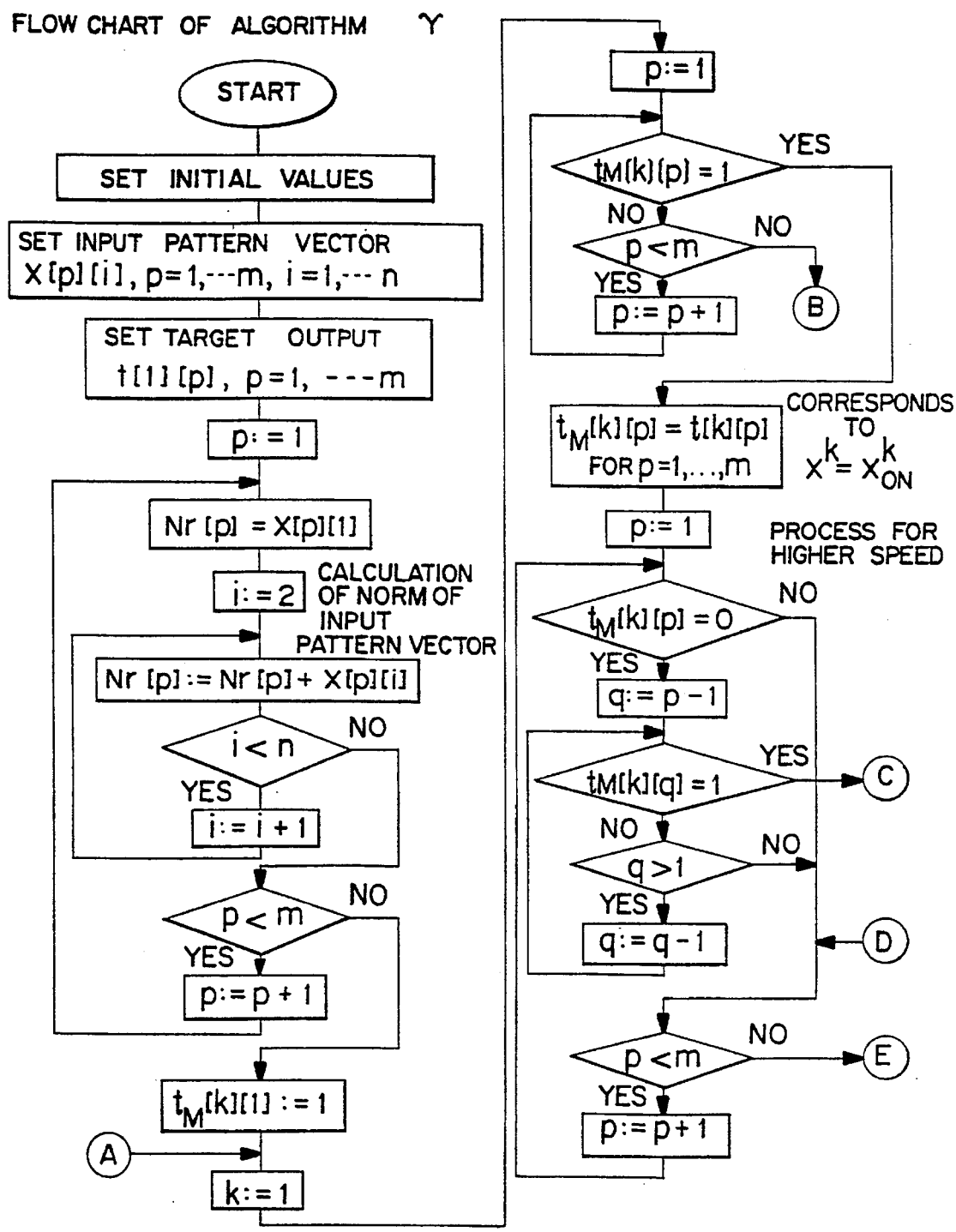
FIGS. 14 through 16 are a flowchart of an algorithm $\gamma$ used in the learning method.
Figure 15:
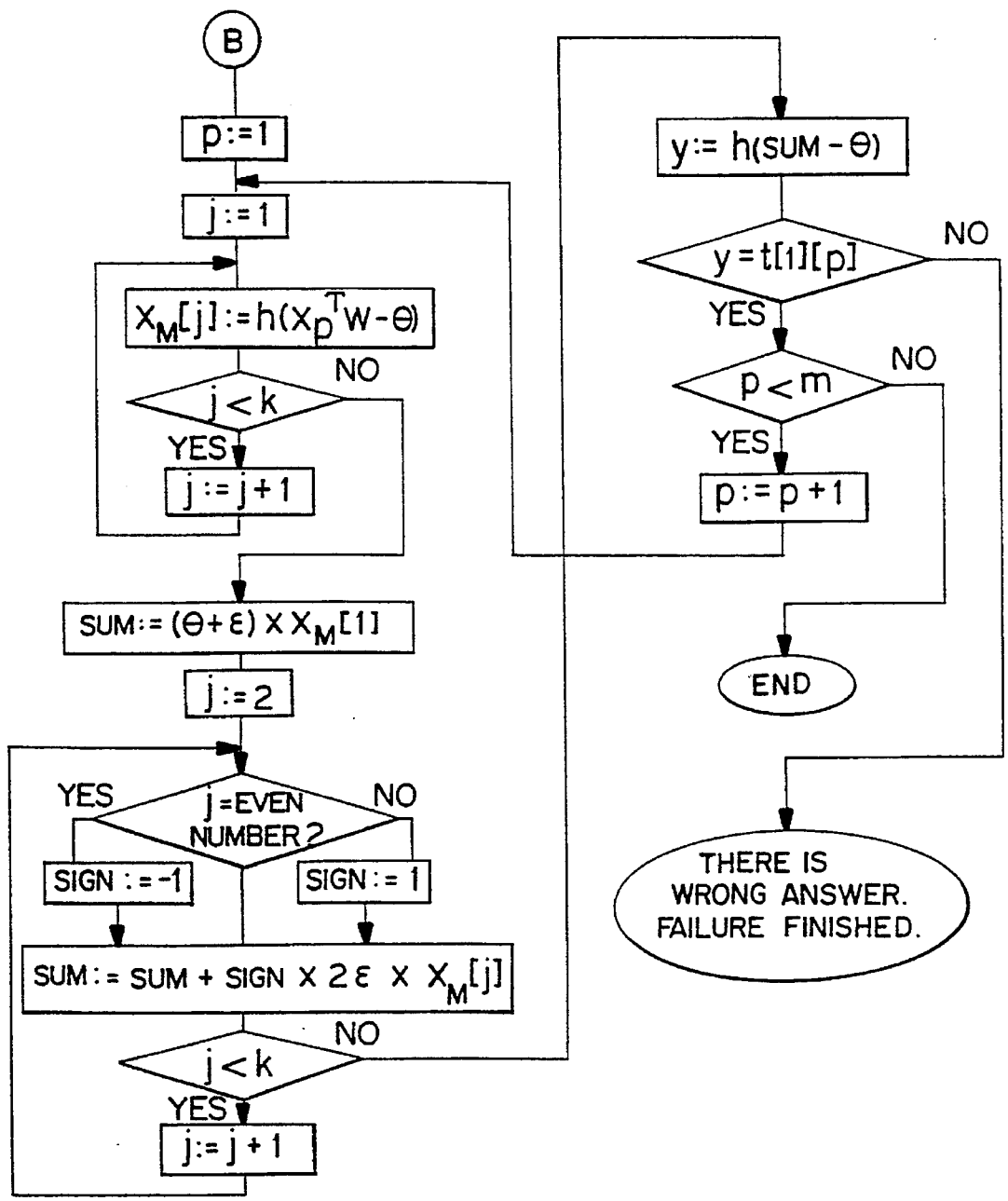
Figure 16:
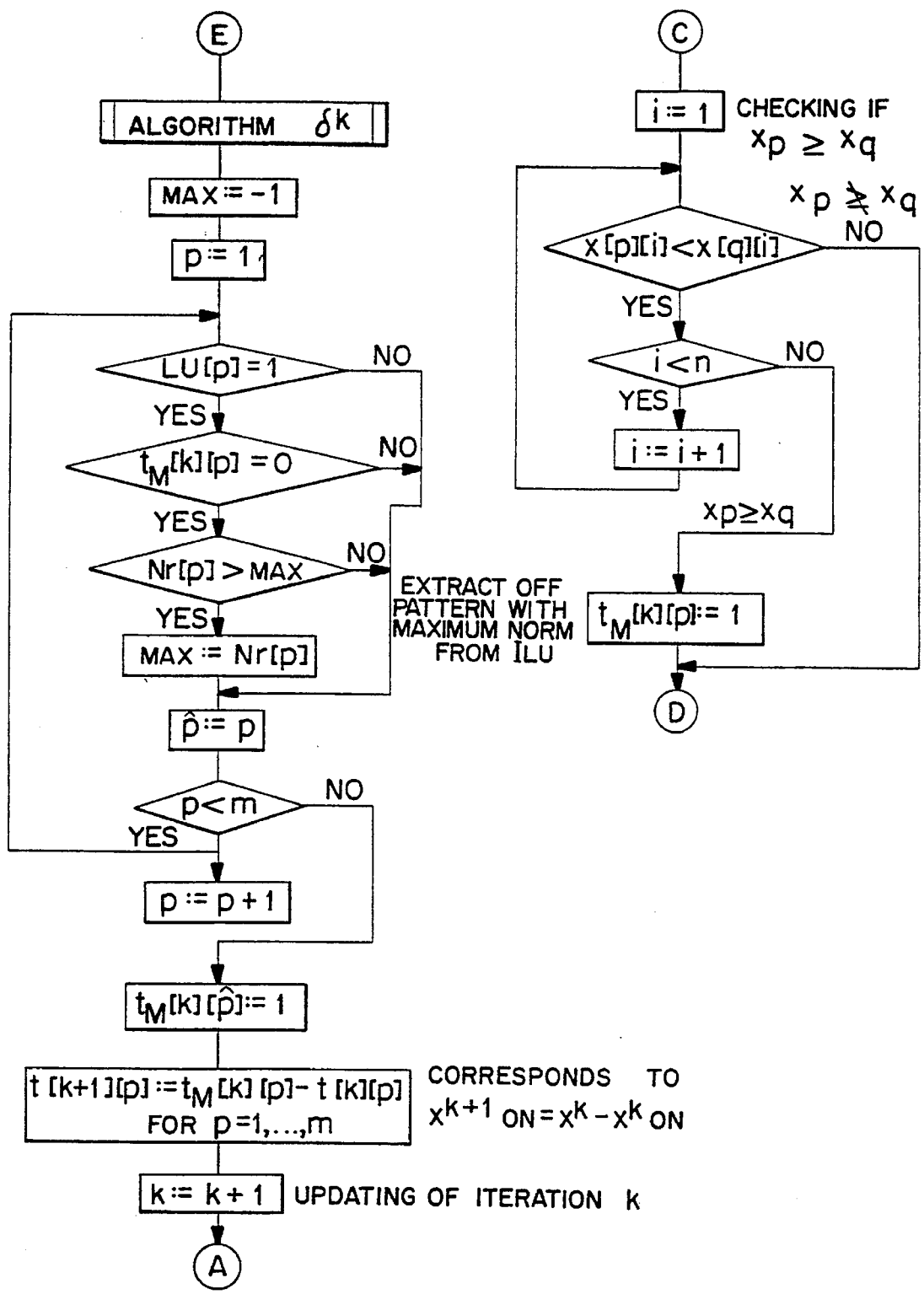
Figure 17:
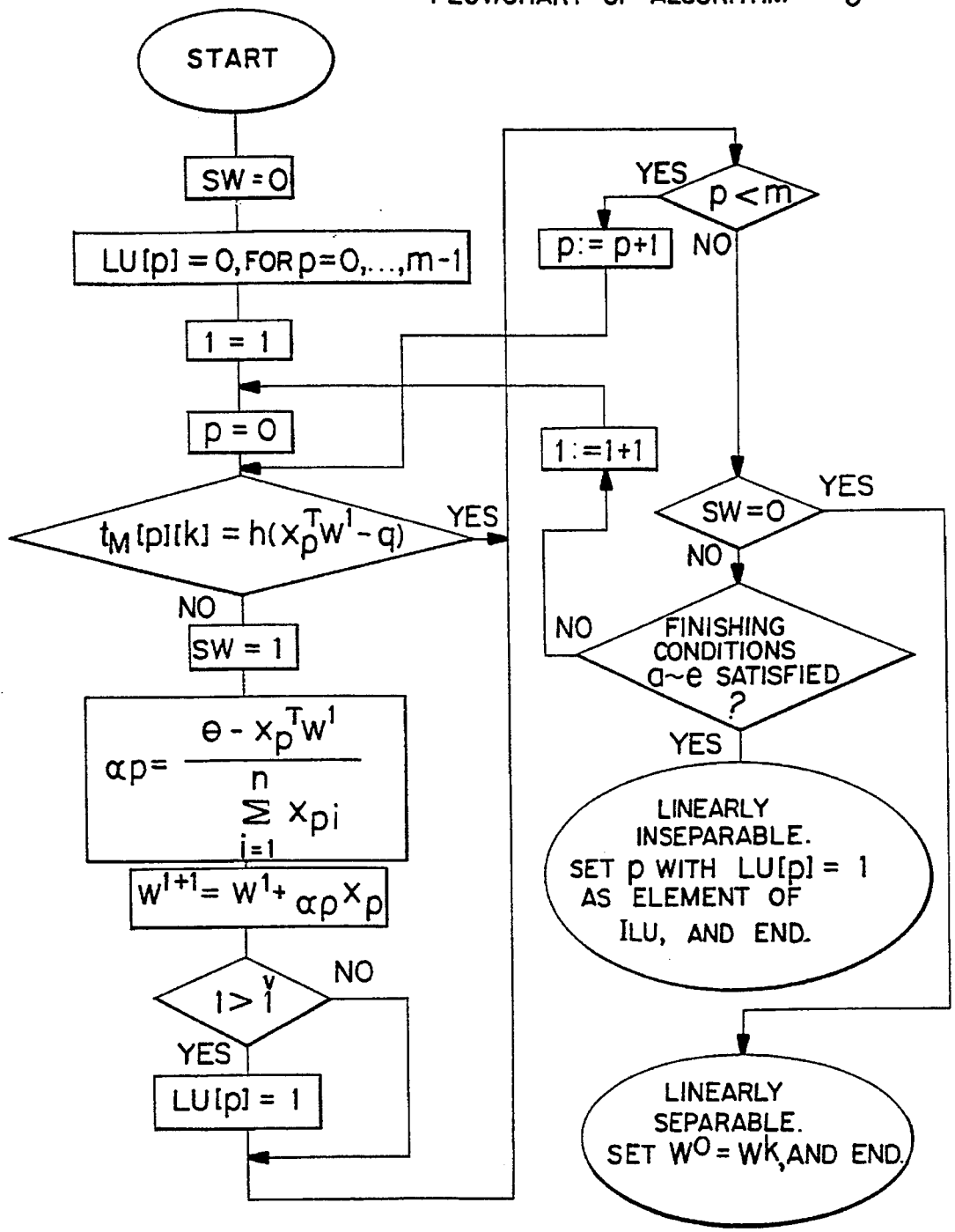
FIG. 17 is a flowchart of an algorithm $\delta^k$ shown in FIG. 16.
Figure 18:
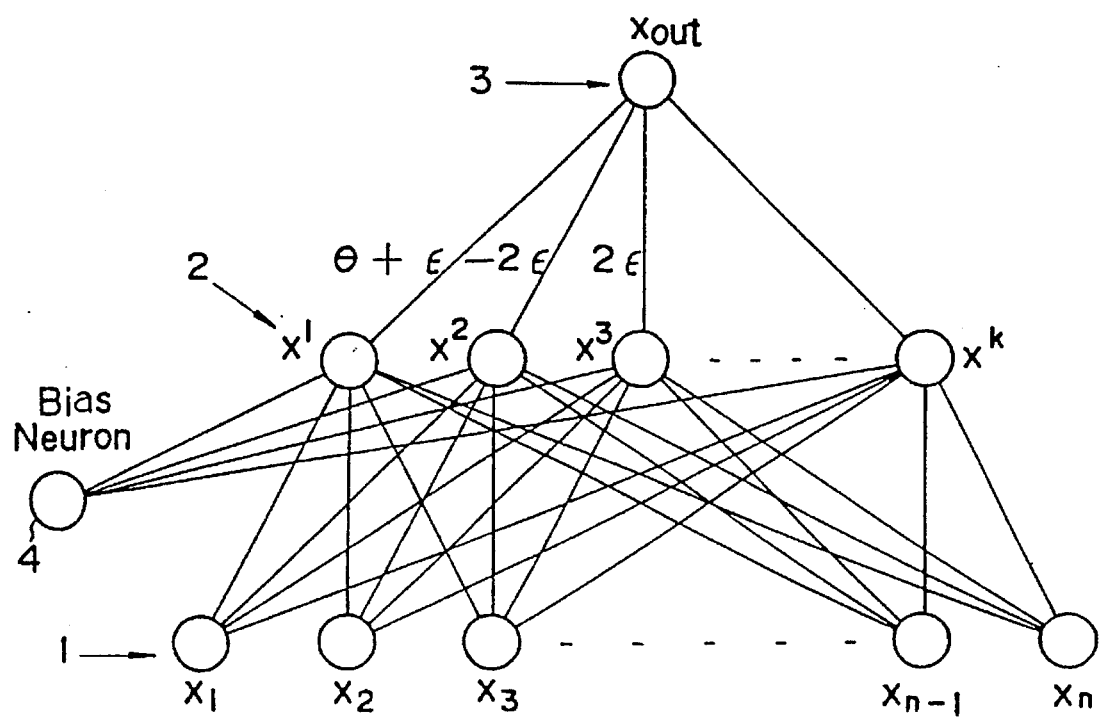
FIG. 18 is a diagram of a neural network with bias neurons.

FIGS. 11 and 12 show the processes according to the algorithms γ, $\delta^k$ in greater detail. FIG. 13 illustrates the definition of letters and symbols in FIGS. 11 and 12. FIGS. 14 through 16 are a detailed flowchart of the algorithm γ including the speeding-up process shown in FIGS. 10(a) through 10(c). FIG. 17 is a detailed flowchart of the algorithm $\delta^k$. FIGS. 14 through 17 are a specific representation of the processes shown in FIGS. 8 and 9. The steps shown in FIGS. 14 through 17 are basically the same as those shown in FIGS. 8 and 9, and will not be described in detail.
(4)-3 Expansion of the algorithms:
According to the above algorithms, the neuron threshold θ is of a fixed positive value. Therefore, $h(w^T x - \theta)$ necessarily becomes 0 at the origin 0. When all inputs are 0, the output has a value of 0. To achieve all patterns including those in which all inputs are 0, a bias neuron 4 may be added as shown in FIG. 18. The bias neuron 4 is always ON so that the output is ON even when all the neurons of the input layer 1 are OFF. The neural network arrangement shown in FIG. 18 makes a learning process possible even if all inputs have a value of 0.

Figure 19:
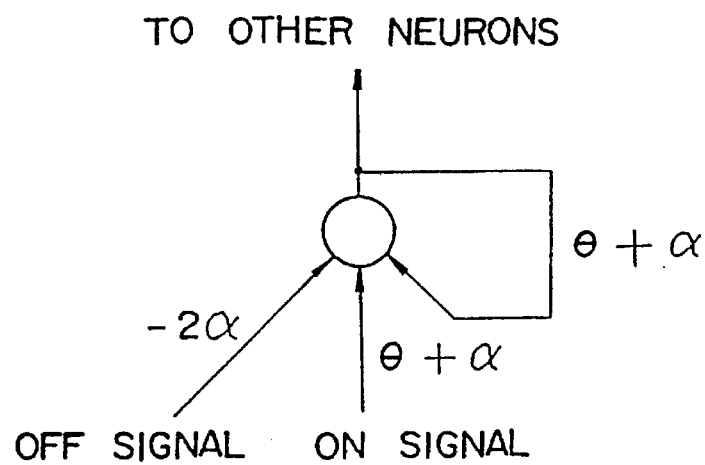
FIG. 19 is a diagram showing a bias neuron unit with a self feedback loop.

In actual biological environments, such a neuron is of a circuit arrangement as shown in FIG. 19 which has a synaptic coupling for self feedback. If such a neuron is used, all input/output patterns including those in which all inputs are 0 can be learned according to the above algorithms.

FIG. 19 shows a bias neuron unit with a self feedback loop. Once an On input signal is applied to the bias neuron unit, the bias neuron unit keeps an ON value at all times. The value of the bias neuron unit may be made OFF if an inhibitory neuron is connected to the input thereof.

Figure 20:
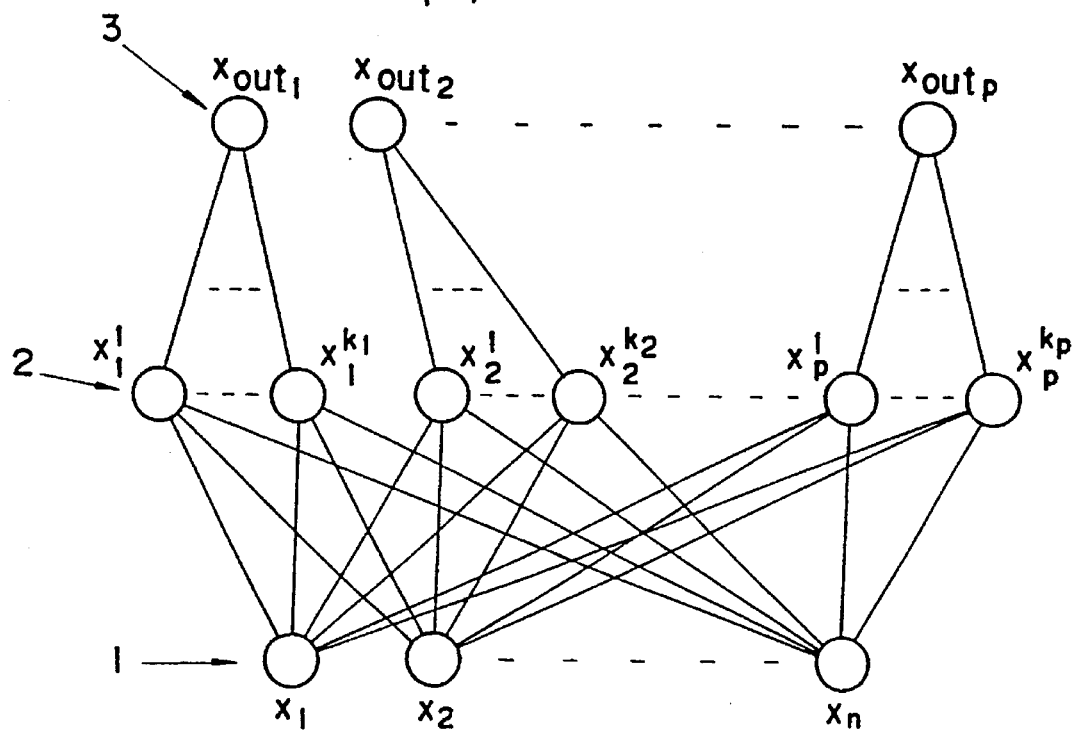
FIG. 20 is a diagram of a neural network with multiple inputs and multiple outputs.

The neural network for executing the above algorithms basically has multiple inputs and a single output. The neural network may be expanded into a multiple-input multiple-output neural network as shown in FIG. 20. Since synaptic couplings between output and hidden layers 3, 2 do not interconnect all the neurons in these layers, the learning process can be carried out at high speed.

The present invention is not limited to the above three-layer network structures, but may be applied to a multilayer neural network structure having a plurality of hidden layers 2 as shown in FIG. 21.

The neural network shown in FIG. 21 comprises an input layer 1, an output layer 3, and three hidden layers 2. The hidden neurons having state values $x^1_1, \ldots, x^{k1}_1; x^1_2, \ldots, x^{k2}_2; \ldots, x^1_p, \ldots, x^{kp}_p$ in the first hidden layer from the input layer 1, and the hidden neurons having state values $^2x_1, \ldots, ^2x_r$ in the third hidden layer adjacent to the output layer 3 are generated as required as the learning process progresses. The hidden neurons having state values $x_1', \ldots, x_p'$ in the second hidden layer are provided in advance as output neurons (corresponding to the output neuron having a state value y in FIG. 3) with respect to the hidden neurons in the first hidden layer.

<Experiments>

To ascertain the effectiveness of LISA, it was checked as to whether it can learn all patterns including linearly unseparable patterns. A numerical experiment was also conducted to see if LISA causes an NP (nondeterministic polynomial) problem or not. The results of these experiments were compared with those of learning processes according to back propagation. The experiments employed "EWS, SUN4/260" manufactured by Sun Micro Systems.

1. Inspection of the learning capability of a neural network:

Generally, it is impossible to determine whether a neural network can learn all patterns actually. A four-input, one-output neural network was subject to experimentation to see if it can learn all input/output patterns. Since the LISA has only a positive threshold, the output would be 0 when all inputs are 0 unless the neural network is expanded into a multiple-input multiple-output neural network as shown in FIG. 20. The learning pattern included two outputs (0, 1) with respect to 15 input patterns except for an input pattern in which all four inputs are 0. The number of all input/output patterns was $2^{15}=32768$.

A back-propagation neural network used for comparison had two layers except for an input layer, and included 4 neurons in the input layer, 8 neurons in the hidden layer, and one neuron in the output layer. Learning parameters were a learning step width $\eta=0.9$ and a bias term coefficient $\alpha=0.9$. The learning process according to back propagation compared a target output and an output pattern of the network in each iteration, and ended when all of the compared outputs were the same. The output of the network was converted into a binary signal using a threshold of 0.5 for comparison with the target output. Therefore, if the output was 0.6, a binary value of 1 was compared with the target output, and if the output was 0.3, a binary value of 0 was compared with the target output.

When the iteration number reached 3,000, the learning of the patterns was interrupted as no solution that would satisfy all the patterns was considered to exist. The results of the experiments are given in Table 1 below.

TABLE 1

| | Learning of 32,768 patterns | |
|---|---|---|
| Algorithm | Back propagation | LISA |
| Calculation time | 162,530.4 sec. | 81.9 sec. |
| Wrong answers | 4085 | 0 |
| Percentage of correct answers | 88% | 100% |

As can be seen from Table 1, the percentage of correct answers according to the back propagation process was 88%, whereas the percentage of correct answers according to LISA was 100%. The time required for learning the patterns according to the back propagation process was about 1,984 times the time required for learning the patterns according to LISA. When the iteration number reached 3,000 according to the back propagation process, the learning process was interrupted as producing wrong answers. The calculation times according to LISA and the back propagation process while no wrong answers were produced are given in Table 2 below. The results given in Table 2 were obtained when 100 patterns were checked as they were solved by the back propagation process, i.e., learned in learning cycles less than 3,000 learning cycles.

TABLE 2

| | Learning of 100 patterns | |
|---|---|---|
| Algorithm | Back propagation | LISA |
| Calculation time | 102.8 sec. | 0.2 sec. |
| Wrong answers | 0 | 0 |
| Percentage of correct answers | 100% | 100% |

Table 2 indicates that subject to no wrong answers, the LISA is 514 times faster than the back propagation process. Therefore, even if the back propagation process can learn patterns with the iteration number being less than 3,000, the LISA is about 500 times faster than the back propagation process. However, as described above with respect to the speeding-up of the algorithms, the learning speed is lower for integer calculations if the threshold is too small. The threshold should preferably be of a value which is as large as possible depending on the memory capacity of the computer used and the dimensions of problems. For four-dimensional problems, the maximum number of neurons generated in the hidden layers of the LISA was 5 during a trial performance on 32,768 patterns.

2. Experiment to see if the LISA causes an NP problem:

Even though the LISA is faster than the back propagation process, if it causes an NP problem when the number of input patterns increases, then the calculation time exponentially increases, and will not be practical. An experiment was conducted to see how the calculation time of the LISA varies with respect to the number of patterns to be learned.

The patterns to be learned were 7-input, 1-output patterns, and N patterns determined according to uniform random numbers were learned 100 patterns each time. The results are shown in the logarithmic graph of FIG. 22. The graph was approximated with a polynomial $(aN^b+c)$ with respect to each of pattern numbers 0, 25, 75, resulting in illustrated curves. The polynomial was represented by $1.5\times10^{-4}N^{2.99}+0.05$. As the pattern number approaches 90, the gradient of the equation was larger than the experimental values. For 7 inputs, the calculation time of the LISA was of a polynomial order, and does not cause an NP problem. For seven-dimensional 127 patterns, the maximum number of neurons generated in the hidden layers of the LISA was 22 during a trial performance on 100 random patterns.

Figure 22:
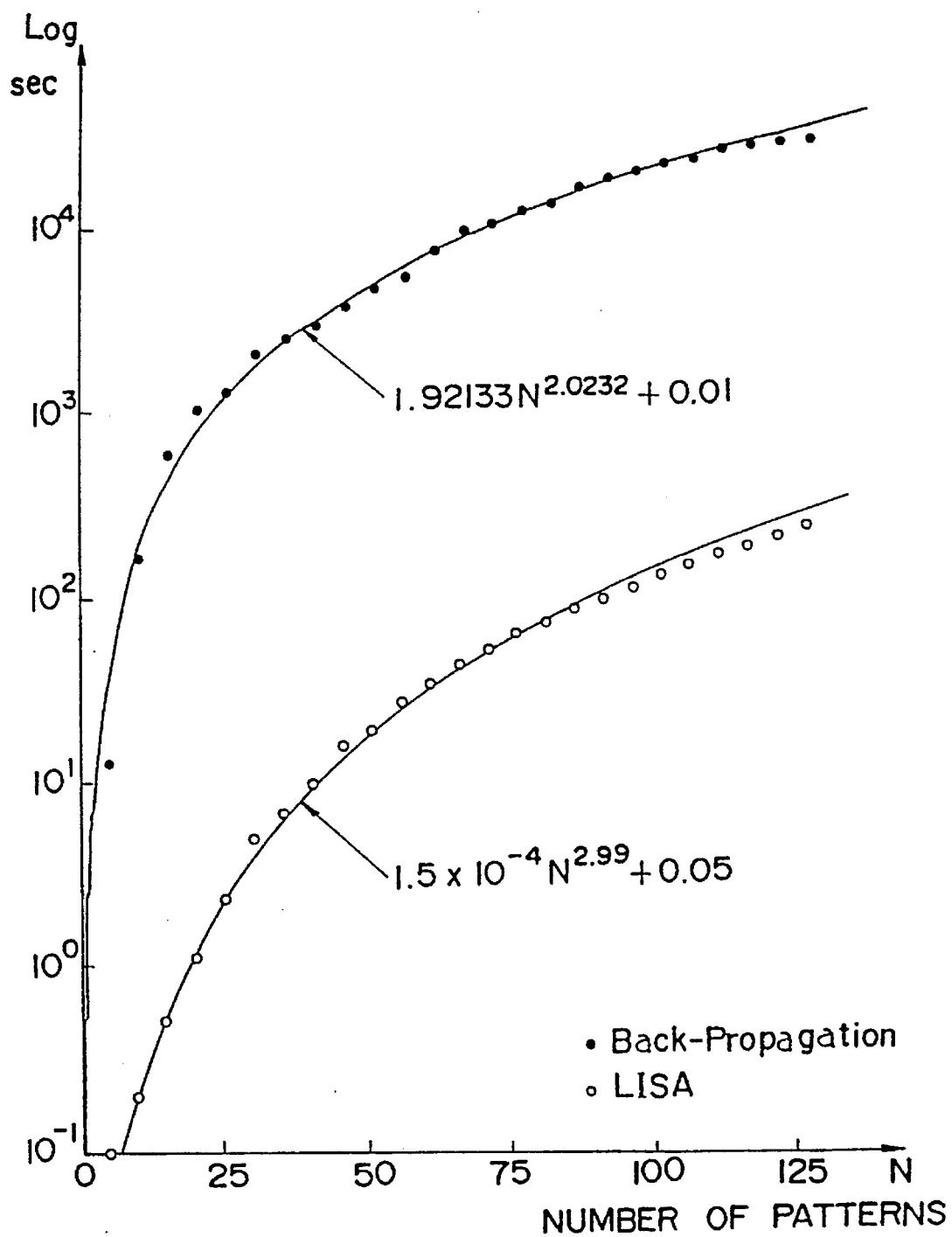
FIG. 22 is a logarithmic graph of calculating times of the learning method of the present invention and the back propagation method.

FIG. 22 also shows the calculation time of the back propagation process. In this experiment, the back propagation process was modified as follows:

When the iteration number exceeded 300, it was considered that the learning process would not converge any more, and the association weights were initialized again according to uniform random numbers, and the learning process was started again. This procedure was repeated up to 5 times. It can be seen from this graph that when the pattern number is 40 or higher, the LISA is about 100 times faster than the back propagation process.

In FIG. 22, the LISA (represented by white dots) is about 100 times faster than the back propagation process (black dots). Since the graph has a vertical axis representing the logarithm of the time, the amount of calculation of either algorithm did not exponentially increase.

If the calculation time increased exponentially, then any plotted calculation time would be indicated by a straight line having a certain gradient. The results of the LISA and the back propagation process show that the gradients thereof were reduced as the pattern number increased. The percentage of correct answers of the back propagation process suddenly started to decrease when the pattern number exceeded about 40 as shown in FIG. 23. Since the curve was similar to that of a sigmoid function, it was approximated by a sigmoid function as shown. The percentage of the LISA was kept at 100% irrespective of the number of patterns. It indicates that the LISA could learn all input/output patterns generated by uniform random numbers.

As shown in FIG. 23, the percentage of correct answers of the LISA was kept at 100% regardless of the pattern number increasing. The percentage of correct answers of the back propagation decreased at the rate of a sigmoid function as the pattern number increased.

The results of the experiments indicate the following:
1. The LISA does not cause an NP problem with respect to the pattern number.
2. For seven inputs, the LISA is about 100 times faster than the back propagation process.
3. The number of patterns that can be learned (the percentage of correct answers) by the back propagation process decreases at the rate of a sigmoid function as the pattern number increases.

When the number of patterns is 50 or more, the percentage of correct answers of the back propagation greatly decreases, and the actual learning speed of the LISA appears to be much more faster than the back propagation process.

As described above, the learning algorithm for a binary neural network which can learn even linearly unseparable patterns according to the present invention makes it possible for the neural network to learn all four-input one-output patterns except for a pattern with all inputs being zero. The learning algorithm of the invention is capable of learning patterns much faster than the conventional algorithm, and requires a calculation time on a polynomial order.

With the present invention, as described above, a linearly unseparable input/output pattern is transformed into several linearly separable patterns, which are then combined by an output layer so that they produce the same output as the original input/output pattern. Therefore, a neural network can learn all input/output patterns irrespective of whether they are linearly separable or unseparable.

Since hidden layer neurons are generated as required, if a pattern is linearly separable, one neuron is sufficient, and if a pattern is linearly unseparable, a minimum number neurons are required or a close number of neurons are sufficient. Thus, a memory required to achieve desired input/output patterns may be of a minimum capacity required. Since the number of association weights between neurons to be modified is also minimum, the learning speed is very high.

Since the conventional back propagation process uses a sigmoid function as a neuron transformation function, the weights vary to a large degree as a local optimum point is approached, but to a very small degree at a point far from the local optimum point. The transformation function used in the present invention has a constant gradient anywhere at points that are inadmissible for the learning process. Because the step width is of a minimum making the present patterns admissible, the association coefficients converge at high speed irrespective of the distance from an optimum point.

According to the present invention, since hidden layer neurons are automatically generated as required, there is no concern required over how many hidden layer neurons are to be employed.

The analysis of a neural network that is produced according to a learning process is highly complex and difficult to achieve. According to the present invention, the network as shown in FIG. 3 is constructed according to the linearly separable allocation method. Since the network shown in FIG. 3 achieves calculations between sets as indicated by the equations described with reference to FIG. 2(b), it can easily be analyzed.

Although certain preferred embodiments of the present invention have been shown and described in detail, it should be understood that various changes and modifications may be made therein without departing from the scope of the appended claims.

What is claimed is:

1. A learning method for a neural network comprising an input layer having a plurality of input neurons for receiving an input signal wherein said plurality of input neurons comprises a predetermined fixed number of input neurons, one or more hidden layers having one or more hidden neurons for processing a signal received from said plurality of input neurons, and an output layer having one or more output neurons for processing a signal received from said hidden neurons and for producing an output signal, the learning method comprising the steps of:

determining whether a given input/output pattern is linearly separable or not;

applying an input pattern to said input layer and a corresponding output value to said hidden neurons to effect a predetermined learning process on said hidden neurons, if said given input/output pattern is linearly separable;

determining association coefficients between said output layer and said hidden layers such that a signal from said hidden neurons and an output signal from said output neurons which receive said signal from said hidden neurons are equal to each other;

allocating a pattern determined by a predetermined learning pattern determining process, between said hidden layers and said input layer to effect said learning process on said hidden neurons, if said given input/output pattern is linearly unseparable;

determining said association coefficients between said output layer and said hidden layers to realize a given input/output pattern with a combination of linearly separable patterns realized by said hidden neurons; and generating the hidden neurons of at least one of said hidden layers depending on said given input/output pattern according to a predetermined process as said learning process progresses, each hidden neuron corresponding to a respective one of said linearly separable patterns.

2. The learning method according to claim 1, wherein said learning process is effected by modifying association coefficients between said hidden layers and said input layer according to a predetermined formula if target and actual outputs are different from each other, extracting a set of patterns from all given patterns according to a predetermined pattern extracting process, and transforming a pattern which is selected from said set of patterns according a predetermined rule into a pattern of different type, thereby finally obtaining a linearly separable pattern.

3. The learning method according to claim 2, wherein said predetermined rule is defined to select a pattern remotest from in origin of a coordinate space in which the pattern is presented.

4. The learning method according to claim 2, wherein said predetermined rule is defined to select a pattern whose inner product with a weight of a predetermined hidden neuron is maximum or minimum.

5. The learning method according to claim 2, further comprising the steps of:

applying an input pattern to said hidden neurons to determine whether an output of said output neurons agrees with the target output or not; and correcting the association coefficients between said hidden layers and said input layer until a predetermined finishing condition is satisfied, if the output of said output neurons disagrees with the target output.

6. The learning method according to claim 5, wherein said finishing condition is satisfied when a number of times that said association coefficients are corrected exceeds a predetermined value.

7. The learning method according to claim 5, wherein said finishing condition is based on a comparison between a present weight and a weight which satisfies a predetermined condition at least one time in the past, when repetitive calculations are effected in said learning process.

8. The learning method according to claim 5, wherein said association coefficients are corrected by a step width which is determined according to a predetermined correction rule each time said association coefficients are to be corrected.

9. The learning method according to claim 5, wherein said finishing condition is based on either a value of a predetermined object function having an argument comprising of said association coefficients, or a hypogradient of said object function.

10. The learning method according to claim 2, wherein said pattern is transformed by transforming an OFF pattern whose target output is 0 into an ON pattern whose target output is 1, and modifying the OFF pattern into an ON pattern when all elements of the OFF pattern have a value equal to or greater than the value of corresponding elements of an ON pattern.

11. The learning method according to claim 2, wherein said set of patterns is extracted by checking a change in the association coefficients between said hidden layers and said input layer, and extracting a set of patterns in which the association coefficients do not change and the target output disagrees with the actual output.

12. The learning method according to claim 1, wherein said learning process is effected by employing different transformation functions $h_{ON}$, $h_{OFF}$ with respect to a given ON pattern whose target output is 1 and a given OFF pattern whose target output is 0, maximizing a sum of the transformation functions with respect to all patterns, and transforming said input/output pattern into a linearly separable pattern based on an optimization condition equation for maximizing the sum of the transformation functions, if said input/output pattern is linearly unseparable.

13. The learning method according to claim 1, further comprising the steps of:

determining a learning pattern according to a predetermined process from an original input/output pattern and an input/output pattern realized by hidden neurons which have been learned; and allocating the learning pattern to hidden neurons that have not been learned.

* * * * *